US012597395B2

(12) United States Patent
Kim et al.

(10) Patent No.: US 12,597,395 B2
(45) Date of Patent: Apr. 7, 2026

(54) DISPLAY DEVICE AND METHOD OF DRIVING THE SAME

(71) Applicant: SAMSUNG DISPLAY CO., LTD., Yongin-si (KR)

(72) Inventors: Sung Hwan Kim, Yongin-si (KR); Won Kyu Kwak, Yongin-si (KR); Jung Hoon Shim, Yongin-si (KR); Yun Kyeong In, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/773,399

(22) Filed: Jul. 15, 2024

(65) Prior Publication Data

US 2024/0371330 A1 Nov. 7, 2024

Related U.S. Application Data

(63) Continuation of application No. 18/064,801, filed on Dec. 12, 2022, now Pat. No. 12,039,937, which is a (Continued)

(30) Foreign Application Priority Data

Mar. 10, 2020 (KR) ........................ 10-2020-0029685

(51) Int. Cl.
*G09G 3/3266* (2016.01)

(52) U.S. Cl.
CPC ... *G09G 3/3266* (2013.01); *G09G 2300/0876* (2013.01)

(58) Field of Classification Search
CPC ......... G09G 3/3266; G09G 2300/0876; G09G 3/3233; G09G 2300/0426;

(Continued)

(56) References Cited

U.S. PATENT DOCUMENTS 8,384,835 B2 2/2013 Yamauchi
8,760,479 B2 6/2014 Shin et al.

(Continued)

FOREIGN PATENT DOCUMENTS

CN 102498510 A 6/2012
CN 103399441 A 11/2013

(Continued)

OTHER PUBLICATIONS

Korean Notice of Allowance dated Oct. 14, 2024, issued in Korean Patent Application No. 10-2020-0029685 (6 pages).

(Continued)

*Primary Examiner* — Patrick N Edouard
*Assistant Examiner* — Joseph P Fox
(74) *Attorney, Agent, or Firm* — Womble Bond Dickinson (US) LLP

(57) ABSTRACT

A display device includes: a display unit including a first display area, and a second display area; a scan driver configured to provide a scan signal to each scan line connected to the plurality of first pixels and the plurality of second pixels; and an emission controller configured to provide an emission control signal to each emission control line connected to the plurality of first pixels and the plurality of second pixels, wherein the plurality of first pixels have a first density in the first display area, the plurality of second pixels have a second density less than the first density in the second display area, and the plurality of second pixels include at least one sub pixel including one boosting capacitor.

10 Claims, 28 Drawing Sheets

Related U.S. Application Data continuation of application No. 17/145,638, filed on Jan. 11, 2021, now Pat. No. 11,527,206.

(58) Field of Classification Search

CPC ... G09G 2300/0452; G09G 2300/0819; G09G 2300/0852; G09G 2300/0861; G09G 2310/0251; G09G 2310/0262; G09G 2320/0219; G09G 3/3225; G09G 3/2096; G09G 3/3208; G09G 2300/0439; G09G 2300/0469; G09G 2300/0809; G09G 2300/0842; G09G 2310/0245; H10K 59/12; H10K 59/40; H10K 59/352

See application file for complete search history.

(56) References Cited

U.S. PATENT DOCUMENTS

| | | | | |
|---|---|---|---|---|
| 10,186,191 | B2 | 1/2019 | Kang et al. | |
| 10,229,637 | B2 | 3/2019 | Ka et al. | |
| 10,331,164 | B2 | 6/2019 | Bao | |
| 10,777,132 | B2 | 9/2020 | Qing | |
| 2010/0177024 | A1 | 7/2010 | Choi | |
| 2012/0001896 | A1* | 1/2012 | Han | G09G 3/3233 345/76 |
| 2016/0163243 | A1 | 6/2016 | Park et al. | |
| 2019/0130822 | A1 | 5/2019 | Jung et al. | |
| 2019/0393286 | A1 | 12/2019 | Ding et al. | |
| 2020/0098318 | A1 | 3/2020 | Liu et al. | |
| 2020/0211468 | A1 | 7/2020 | Cho et al. | |

FOREIGN PATENT DOCUMENTS

| | | | |
|---|---|---|---|
| CN | 106782286 | A | 5/2017 |
| CN | 107025875 | A | 8/2017 |
| CN | 109192142 | A | 1/2019 |
| CN | 109215582 | A | 1/2019 |
| CN | 109872670 | A | 6/2019 |
| JP | 2011-150009 | A | 8/2011 |
| KR | 10-2017-0065059 | A | 6/2017 |
| KR | 10-2017-0113066 | A | 10/2017 |
| KR | 10-2017-0136128 | A | 12/2017 |
| KR | 10-2019-0010058 | A | 1/2019 |
| KR | 10-2019-0091557 | A | 8/2019 |
| KR | 10-2019-0119960 | A | 10/2019 |
| WO | WO 2021/112854 | A1 | 6/2021 |

OTHER PUBLICATIONS

Chinese Office Action for CN Application No. 202110243920.6, dated Mar. 11, 2025, 11 pages.

* cited by examiner

DISPLAY DEVICE AND METHOD OF DRIVING THE SAME

CROSS-REFERENCE TO RELATED APPLICATIONS

This application is a continuation of U.S. patent application Ser. No. 18/064,801, filed Dec. 12, 2022, which is a continuation of U.S. patent application Ser. No. 17/145,638, filed Jan. 11, 2021, now U.S. Pat. No. 11,527,206, which claims priority to and the benefit of Korean Patent Application No. 10-2020-0029685, filed Mar. 10, 2020, the entire content of all of which is incorporated herein by reference.

BACKGROUND

1. Field

Aspects of some example embodiments of the present disclosure relate to a display device and a method of driving the same.

2. Description of the Related Art

A display device such as a general smart phone may include at least one display area. The display area may be a data output device, and input data may be displayed on the display area. In addition, the display area may be provided with a touch sensor and may be operated as a touch screen. Such a display area may be employed on a front surface of the display device to display various information.

Recently, in a display device such as a mobile terminal, as the display area occupies most of the front surface, a camera, a proximity sensor, a fingerprint recognition sensor, an illumination sensor, a near-infrared sensor, and the like may overlap at least one area of the display area.

Recently, flat panel display devices such as liquid crystal displays (LCDs), plasma display panels (PDPs), or organic light emitting diodes (OLEDs) are most commonly utilized as image display devices.

The above information disclosed in this Background section is only for enhancement of understanding of the background and therefore the information discussed in this Background section does not necessarily constitute prior art.

SUMMARY

Aspects of some example embodiments of the present disclosure include a display device and a method of driving the same capable of easily adjusting a luminance of pixels in a display area with which a sensor or the like overlaps.

Aspects of some example embodiments of the present disclosure are not limited to the characteristics described above, and other technical characteristics that are not described will be more clearly understood by those skilled in the art from the following description.

A display device according to some example embodiments of the disclosure for solving the above-described characteristics includes a display unit including a first display area having a plurality of first pixels, and a second display area having a plurality of second pixels, a data driver configured to provide a data signal to each data line connected to the plurality of first pixels and the plurality of second pixels, a scan driver configured to provide a scan signal to each scan line connected to the plurality of first pixels and the plurality of second pixels, and an emission controller configured to provide an emission control signal to each emission control line connected to the plurality of first pixels and the plurality of second pixels. The plurality of first pixels have a first density in the first display area, the plurality of second pixels have a second density less than the first density in the second display area, and the plurality of second pixels include at least one sub pixel including one boosting capacitor connected between a node electrically connected to a gate electrode of each driving transistor and the emission control line.

According to some example embodiments, the plurality of first pixels may include at least one sub pixel including a first boosting capacitor connected between a node to which a gate electrode of each driving transistor is connected and the scan line, and the plurality of second pixels may include at least one sub pixel including the first boosting capacitor and a second boosting capacitor that is the one boosting capacitor.

According to some example embodiments, in the sub pixel of the second pixels, a capacitance of the second boosting capacitor may be greater than a capacitance of the first boosting capacitor.

According to some example embodiments, the one boosting capacitor may include a first electrode formed on a member electrically connected to the emission control line, and a second electrode formed on a member electrically connected to the gate electrode of the driving transistor.

According to some example embodiments, the at least one sub pixel may further include another boosting capacitor including a third electrode formed on a member electrically connected to the scan line, and a fourth electrode formed on a member electrically connected to the gate electrode of the driving transistor.

According to some example embodiments, the first electrode may be formed on a first gate electrode layer, the second electrode may be formed on a first source-drain electrode layer, and the first source-drain electrode layer may be on the first gate electrode layer.

According to some example embodiments, the first gate electrode layer may include the emission control line, and the first source-drain electrode layer may include an electrode pattern electrically connected to the node and in which an overlap area overlapping the emission control line is defined.

According to some example embodiments, the gate electrode and the emission control line may be physically separated from each other.

According to some example embodiments, the plurality of first pixels may not include the one boosting capacitor.

According to some example embodiments, the display device may further include a second gate electrode layer on the first gate electrode layer, and a second source-drain electrode layer on the first source-drain electrode layer, and the first source-drain electrode layer may be on the second gate electrode layer.

According to some example embodiments, the driving transistor may be a P-type transistor.

According to some example embodiments, the display device may further include a sensor overlapping the second display area.

According to some example embodiments, the first density may be greater than the second density 4 to 16 times.

A method of driving a display device according to some example embodiments of the disclosure includes a first display area in which a plurality of first pixels have a first density, and a second display area in which a plurality of second pixels have a second density less than the first density. The method includes, per frame, an initialization period that is a period in which a gate electrode of each driving transistor or an anode of a light emitting element of the plurality of first pixels and the plurality of second pixels is initialized to an initialization voltage, a data writing period that is a period in which a data signal is written to a first electrode of each driving transistor after the initialization period, a delay period that is a period before light emission of the light emitting element starts, after the data writing period, and an emission period in which each light emitting element of the plurality of first pixels and the plurality of second pixels emits light after the delay period. A voltage level of the gate electrode of the plurality of first pixels is decreased by a first level in the emission period, and a voltage level of the gate electrode of the plurality of second pixels is decreased by a second level greater than the first level in the emission period.

According to some example embodiments, the voltage level of the gate electrode of the plurality of first pixels may be increased by a third level in the delay period, and the voltage level of the gate electrode of the plurality of second pixels may be increased by a fourth level less than the third level in the delay period.

According to some example embodiments, each of the plurality of first pixels and the plurality of second pixels may include a first transistor which is the driving transistor, a second transistor, a third transistor, a fourth transistor, a fifth transistor, and a sixth transistor, a first electrode of the first transistor may be connected to the fifth transistor, a second electrode of the first transistor may be connected to the sixth transistor, a gate electrode of the first transistor is connected to a first node, the second transistor may be connected between a data line and the first electrode of the first transistor, a gate electrode of the second transistor may be connected to a first scan line, the third transistor may be connected between the first electrode of the first transistor and the first node, a gate electrode of the third transistor may be connected to the first scan line, the fourth transistor may be connected between the first node and an initialization power line to which initialization power is applied, a gate electrode of the fourth transistor may be connected to a second scan line, and each gate electrode of the fifth transistor and the sixth transistor may be connected to an emission control line to which an emission control signal is supplied.

According to some example embodiments, the first transistor, the second transistor, the third transistor, the fourth transistor, the fifth transistor, and the sixth transistor may be P-type transistors.

According to some example embodiments, the plurality of second pixels may further include a first boosting capacitor connected between the first node and the emission control line.

According to some example embodiments, each of the plurality of first pixels and the plurality of second pixels may further include a second boosting capacitor connected between the first node and the first scan line.

A display device according to some example embodiments of the disclosure for solving the above-described object includes a display unit including a first display area having a plurality of first pixels, and a second display area having a plurality of second pixels, a data driver configured to provide a data signal to each data line connected to the plurality of first pixels and the plurality of second pixels, a scan driver configured to provide scan signals to a first scan line, a second scan line, and a third scan line each connected to the plurality of first pixels and the plurality of second pixels, and an emission controller configured to provide an emission control signal to each emission control line connected to the plurality of first pixels and the plurality of second pixels. The plurality of first pixels have a first density in the first display area, the plurality of second pixels have a second density less than the first density in the second display area, and the plurality of second pixels include at least one sub pixel including a first boosting capacitor connected between a node electrically connected to a gate electrode of each driving transistor included in each of the second pixels and the first scan line and a second boosting capacitor connected between the node and the second scan line.

According to some example embodiments, each of the plurality of first pixels and the plurality of second pixels may include a first transistor which is the driving transistor, a second transistor having a gate electrode connected to the first scan line, and a third transistor having a gate electrode connected to the second scan line.

According to some example embodiments, the first transistor and the second transistor may be P-type transistors, and the third transistor may be an N-type transistor.

According to some example embodiments, the display device may be driven per frame by including an initialization period that is a period in which a gate electrode of each driving transistor or an anode of a light emitting element of the plurality of first pixels and the plurality of second pixels is initialized to an initialization voltage, a data writing period that is a period in which the data signal is written to a first electrode of each driving transistor after the initialization period, a delay period that is a period before light emission of the light emitting element starts, after the data writing period, and an emission period in which each light emitting element of the plurality of first pixels and the plurality of second pixels emits light after the delay period, a voltage level of the gate electrode of the plurality of first pixels may be decreased by a first level in the delay period, and a voltage level of the gate electrode of the plurality of second pixels may be decreased by a second level less than the first level in the delay period.

According to some example embodiments, at least one of the scan signals may be transited to a gate-on level at a time point at which the initialization period is started and may be transited to a gate-off level at a time point at which the delay period is started.

According to some example embodiments, the display device may be a mobile terminal.

According to some example embodiments, a capacitance of the second boosting capacitor may be less than a capacitance of the first boosting capacitor.

According to some example embodiments of the disclosure, the display device may relatively easily adjust a luminance of the pixels while including the display area with which a sensor or the like overlaps.

In addition, the display device may relatively easily adjust the luminance of the pixels while providing a data signal of the same voltage level to the pixels of the display area with which the sensor or the like overlaps and the pixels of the display area with which the sensor or the like does not overlap.

The characteristics of embodiments according to the present disclosure are not limited by the characteristics described above, and more various effects are included in the present specification.

BRIEF DESCRIPTION OF THE DRAWINGS

The above and other characteristics of the invention will become more apparent by describing in further detail aspects of some example embodiments thereof with reference to the accompanying drawings, in which.

DETAILED DESCRIPTION

Figure 1:
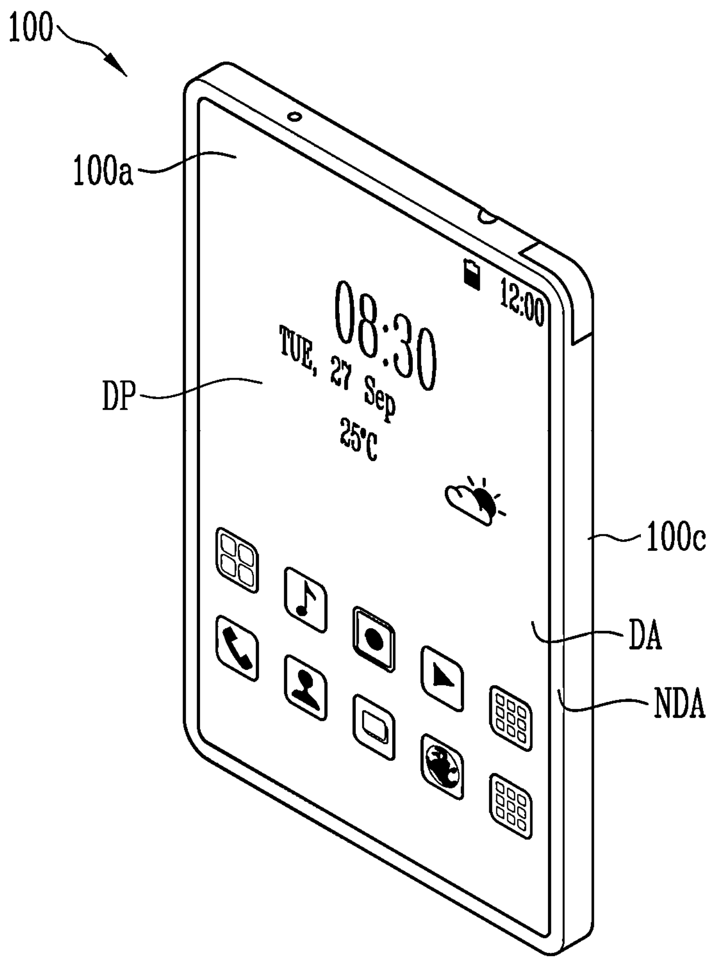
FIG. 1 is a perspective view schematically illustrating a front surface of a display device according to some example embodiments.

The characteristics of embodiments according to the present disclosure and a method of achieving them will become apparent with reference to the embodiments described in detail below together with the accompanying drawings. However, the embodiments according to the present disclosure are not limited to the embodiments disclosed below, and may be implemented in various different forms. The present example embodiments are provided so that the disclosure will be more thorough and more complete and those skilled in the art to which the disclosure pertains can fully understand the scope of the disclosure. The embodiments according to the present disclosure are defined by the scope of the claims and their equivalents.

A case in which an element or a layer is referred to as "on" another element or layer includes a case in which another layer or another element is arranged directly on the other element or between the other layers. The same reference numerals denote to the same components throughout the specification.

Although a first, a second, and the like are used to describe various components, these components are not limited by these terms. These terms are used only to distinguish one component from another component. Therefore, a first component mentioned below may be a second component within the technical spirit of the disclosure. Singular expressions include plural expressions unless the context clearly indicates otherwise.

Hereinafter, the description will be given based on example embodiments in which the display device is implemented in a form of a mobile terminal such as a smart phone. However, embodiments according to the present disclosure are not limited thereto, and the display device may be implemented in a form of various smart devices including a notebook, a monitor, a TV, a mobile phone, an MP3 player, a medical measuring device, a wearable device, and an HMD unless the spirit of the disclosure is changed.

Hereinafter, aspects of some example embodiments of the present disclosure will be described in more detail with reference to the accompanying drawings. The same or similar reference numerals are used for the same components in the drawings.

Figure 2:
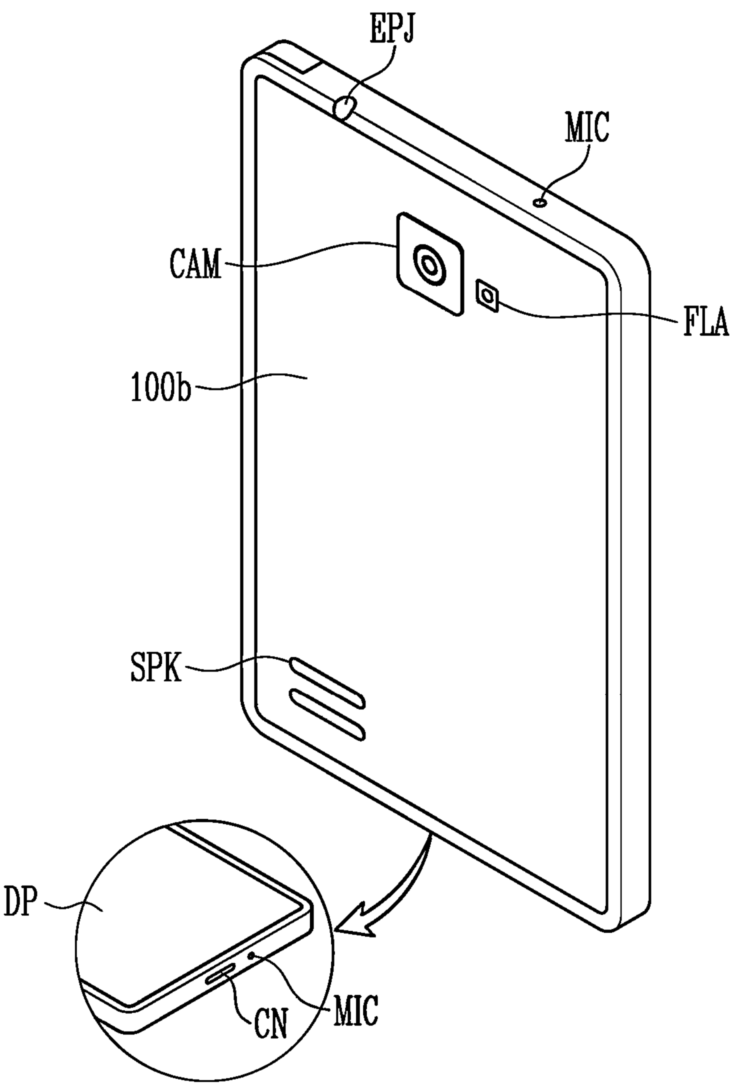
FIG. 2 is a perspective view schematically illustrating a rear surface of the display device of FIG. 1.

FIG. 1 is a perspective view schematically illustrating a front surface of a display device according to some example embodiments. FIG. 2 is a perspective view schematically illustrating a rear surface of the display device of FIG. 1.

FIG. 1 illustrates an example in which a main home screen is displayed on a display panel DP of the display device 100 for convenience.

Referring to FIGS. 1 and 2, the display panel DP may be arranged on the front surface 100*a* of the display device 100 according to some example embodiments of the present disclosure. The front surface 100*a* of the display device 100 may include a display area DA in which the display panel DP is formed to display various data and a non-display area NDA provided on at least one side of the display area DA.

A rear camera CAM, a flash FLA, a speaker SPK, and the like may be located on the rear surface 100*b* of the display device 100. In addition, a power/reset button, a volume button, a terrestrial DMB antenna for broadcasting reception, one or a plurality of microphones MIC, and the like may be located on a side surface 100*c* of the display device 100 according to some example embodiments of the present disclosure. In addition, a connector CN may be formed on a lower side surface of the display device 100. A number of electrodes may be formed in the connector CN and may be connected to an external device in a wired manner. An earphone connection jack EPJ may be arranged on an upper side surface of the display device 100.

In the above-described display device 100, a part such as a sensor may be arranged under an inside of the display panel DP. Therefore, an appearance of the front surface 100*a* may be beautiful, and a wider display area DA may be secured. The part may be an optical part related to light. For example, the part may be an optical part through which external light is incident or emits light. The optical part may include, for example, a fingerprint scanner, an image capture device, a strobe, an optical sensor, a proximity sensor, an indicator, a solar panel, or the like.

The display panel DP may be formed as a large screen to occupy the entire front surface 100*a* of the display device 100. When the display panel DP is entirely arranged on the front surface 100*a* of the display device 100, the display device 100 may be substantially referred to as a "full front display". Here, in the "full front display", the entire front surface 100*a* of the display device 100 may be the display area DA.

The above-described display panel DP may be, for example, an organic light emitting display panel. In this case, the display device 100 employing the above-described display panel DP may be an organic light emitting display device. According to some example embodiments, the display panel DP may be configured as a touch screen including touch electrodes.

As shown in FIG. 1, a main home screen may be displayed on the display panel DP, and the main home screen may be a first screen displayed on the display panel DP when the display device 100 is turned on. At this time, a state of the display device 100, such as a battery charging state, an intensity of a received signal, and a current time may be displayed on an upper end of the display panel DP. The display panel DP may display various contents (for example, a text, an image, a video, an icon, a symbol, or the like) to a user.

Figure 3:
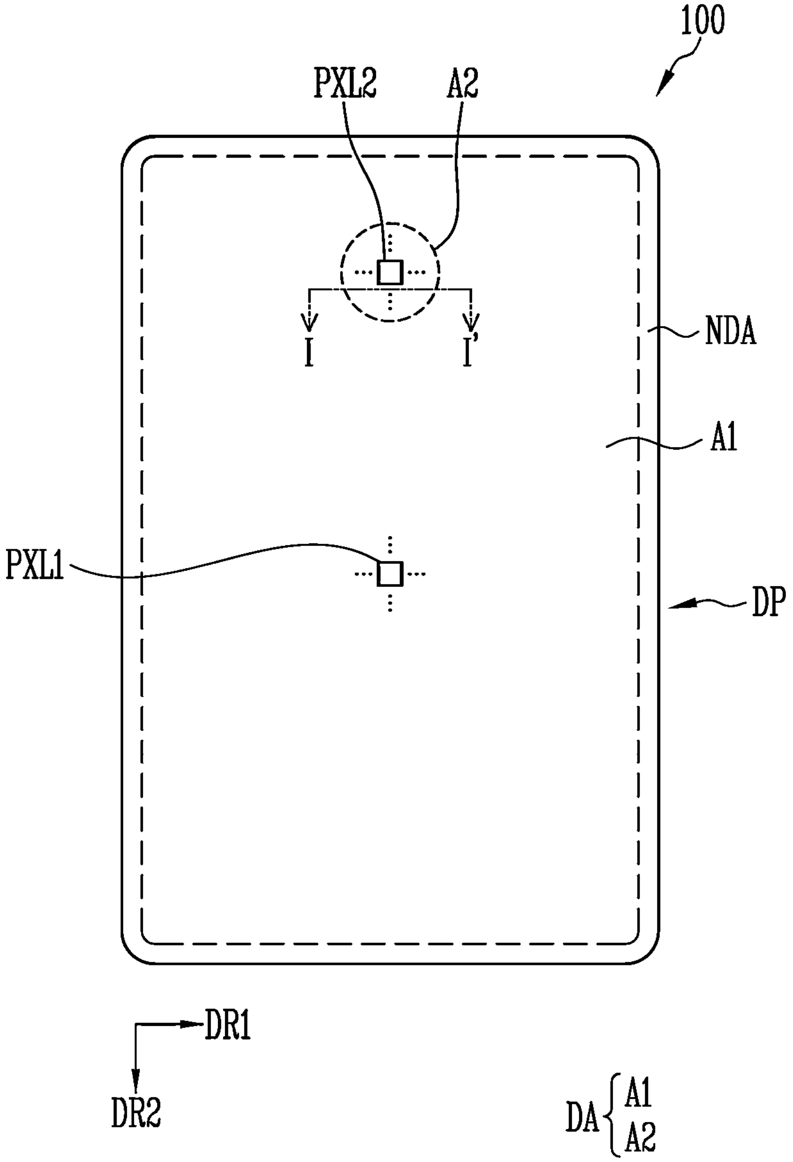
FIG. 3 is a plan view schematically illustrating the display device according to some example embodiments of the disclosure.
Figure 4:
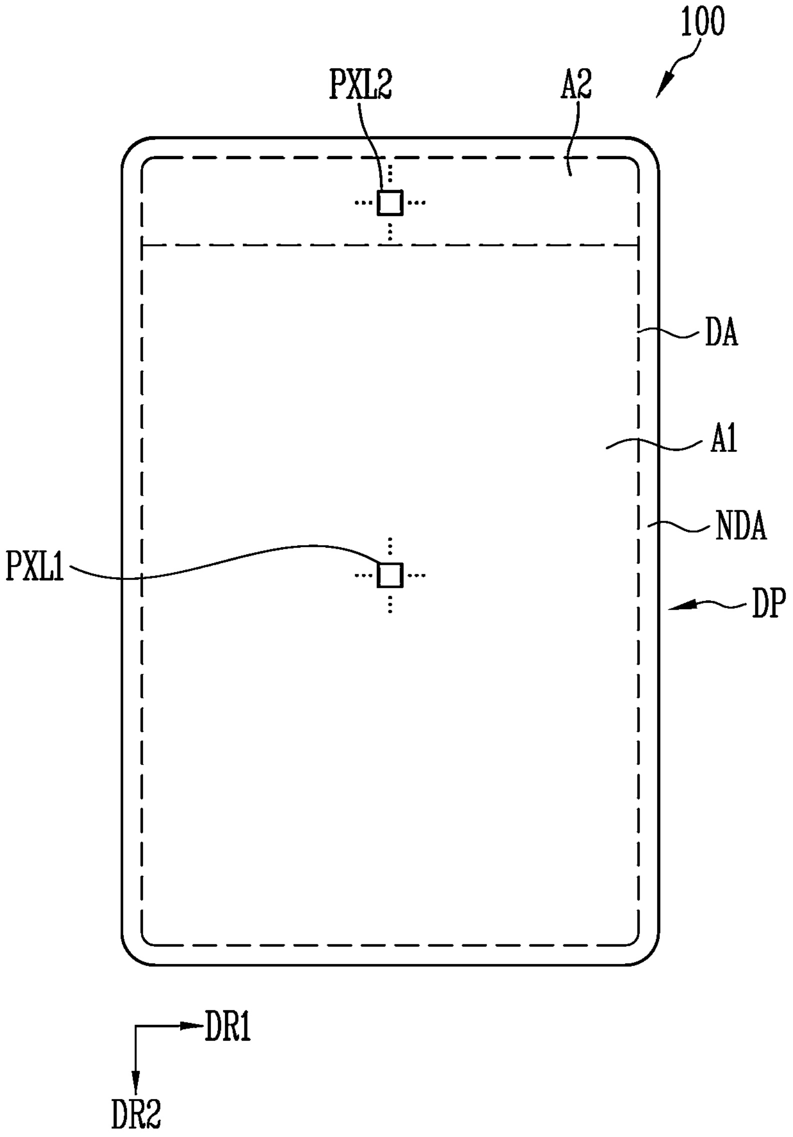
FIGS. 4 and 5 are modified examples of FIG. 3.
Figure 5:
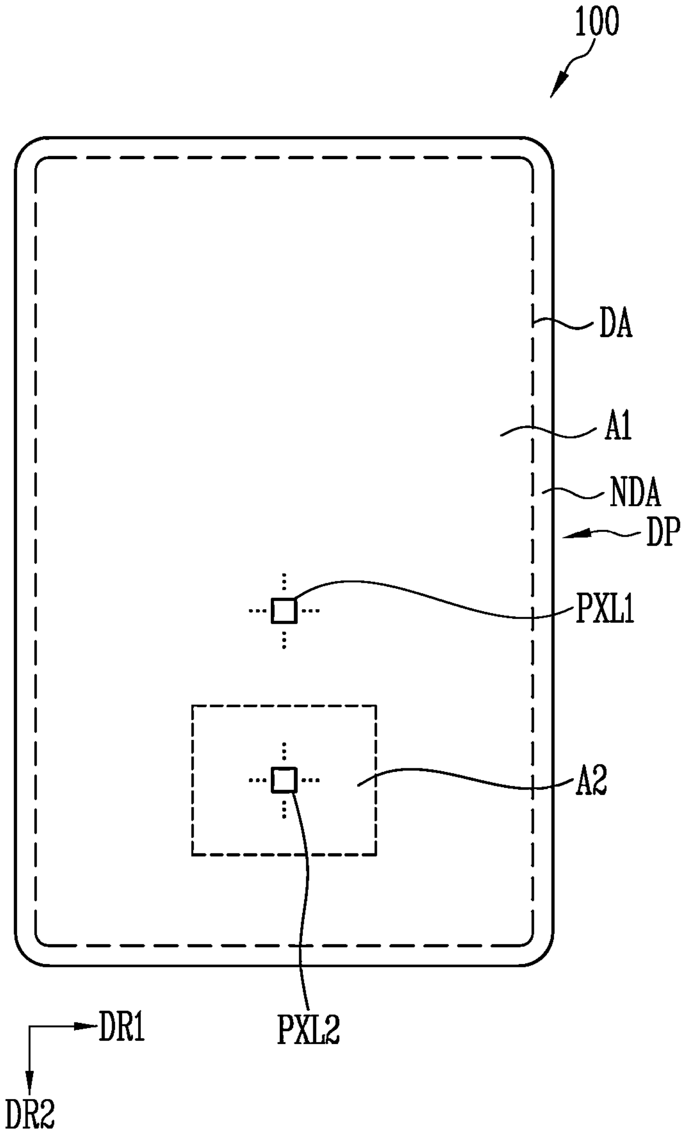
Figure 6:
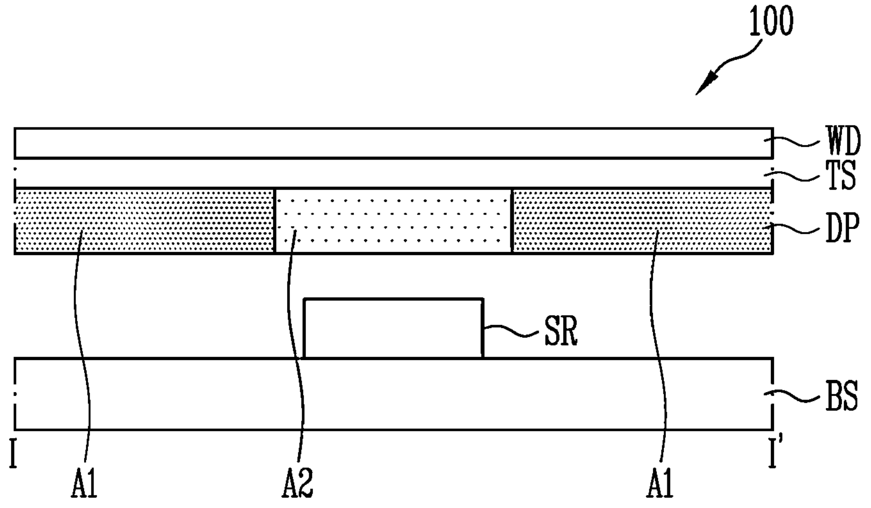
FIG. 6 is a cross-sectional view taken along a line I-I' of FIG. 3.

FIG. 3 is a plan view schematically illustrating the display device according to some example embodiments of the disclosure. FIGS. 4 and 5 are modified examples of FIG. 3. FIG. 6 is a cross-sectional view taken along a line I-I' of FIG. 3.

Referring to FIGS. 1 to 6, all or at least a portion of the display device 100 may have flexibility. For example, the display device 100 may have flexibility in the entire area or may have flexibility in an area corresponding to a flexible area. When the entire display device 100 has flexibility, the display device 100 may be a rollable display device, and when a portion of the display device 100 has flexibility, the display device 100 may be a foldable display device. However, the disclosure is not limited thereto.

According to some example embodiments of the disclosure, the display device 100 may include a display panel DP, a touch sensor TS, a window WD, and at least one sensor SR.

The display panel DP may be arranged on the front surface of the display device 100.

The display panel DP displays arbitrary visual information on the front surface (for example, an image display surface), for example, a text, a video, a photo, a two-dimensional or three-dimensional image, and the like. The display panel DS displays an image and a type of the display panel DP is not particularly limited. As the display panel DP, a display panel capable of self-emission such as an organic light emitting display panel (OLED panel) may be used. In addition, as the display panel DP, a non-luminous display panel, such as a liquid crystal display panel (LCD panel), an electrophoretic display panel (EPD panel), and an electrowetting display panel (EWD panel) may be used. When the non-luminous display panel is used as the display panel DP of the display device 100 according to some example embodiments of the disclosure, the display device 100 may include a backlight unit that supplies light to the display panel DP. According to some example embodiments of the disclosure, the description will be given based on an example in which the display panel DP is the organic light emitting display panel. However, the type of the display panel DP is not limited thereto, and another display panel may be used within a range (or limit) consistent with the concept of the disclosure. According to some example embodiments of the disclosure, the display panel DP may have the same configuration as the display panel DP employed in the display device 100 shown in FIG. 1A.

The display panel DP may include the display area DA and the non-display area NDA surrounding at least one side of the display area DA.

A plurality of pixels PXL1 and PXL2 may be arranged in the display area DA. According to some example embodiments, each of the pixels PXL1 and PXL2 may include at least one light emitting element. According to some example embodiments, the light emitting element may be an organic light emitting diode or a light emitting unit including ultra-small inorganic light emitting diodes having a size ranging from micro to nanoscale, but the disclosure is not limited thereto. The display panel DP may display an image in the display area DA by driving the pixels PXL1 and PXL2 in correspondence with input image data. The display area DA may be formed as a large screen to occupy most of the front surface of the display device 100.

The non-display area NDA may be an area surrounding at least one side of the display area DA, and may be a remaining area except for the display area DA. According to some example embodiments, the non-display area NDA may include a line area, a pad area, various dummy areas, and/or the like.

According to some example embodiments of the disclosure, the display area DA may be formed to encompass the entire front surface (or nearly the entirety of the front surface) of the display device 100 as shown in FIGS. 3 to 5. As the display area DA is formed on the entire front surface of the display device 100, according to some example embodiments, the non-display area NDA may not be formed or may be formed in a very narrow (or minimal) area on the front surface. For example, the display area DA may be formed so as to be in contact with a side surface edge of the display device 100 or so as to be spaced apart from the side surface edge of the display device 100 at a distance (e.g., a set or predetermined distance). In FIGS. 3 to 5, the display area DA is formed only on the front surface of the display device 100, but embodiments according to the disclosure are not limited thereto. According to some example embodiments, the display area DA may be formed at at least one area of the side surface edge of the display device 100 or at least one area of the rear surface. The display areas DA formed at a plurality of surfaces of the display device 100 may be at least partially connected to or separated from each other.

According to some example embodiments of the disclosure, the display device 100 may include at least one sensor SR formed to overlap at least a portion of the display area DA. The sensor SR may be formed under the pixels PXL1 and PXL2 and/or lines formed in the display area DA, and may be concealed with respect to the front surface of the display device 100. When such a sensor SR is formed under the display area DA to overlap at least a portion of the display area DA, the appearance of the display device 100, for example, the appearance of the front surface corresponding to the display area DA becomes beautiful, and the wider display area DA may be secured.

According to some example embodiments of the disclosure, the display area DA may be divided into a first display area A1 and a second display area A2. The first display area A1 may be an area that is not overlapping the sensor SR, and the second display area A2 may be an area overlapping the sensor SR. In various embodiments, the first display area A1 may be set to have a greater size (or area) than the second display area A2.

As shown in FIGS. 3 and 5, the second display area A2 may be located inside the display area DA and may be surrounded by the first display area A1. In FIG. 3, the second display area A2 has a substantially circular shape, but the disclosure is not limited thereto. According to some example embodiments, as shown in FIG. 5, the second display area A2 may have a polygonal shape including a quadrangle and may have various shapes such as an ellipse. In addition, a plurality of second display areas A2 may be arranged in the display area DA.

As shown in FIG. 4, the display area DA may include the first display area A1 and the second display area A2 partitioned along one direction, for example, a second direction DR2. The first display area A1 and the second display area A2 may be connected adjacent to each other. According to some example embodiments, the second display area A2 may be provided (or set) to have the area wider than an area overlapping the sensor SR. For example, as shown in FIG. 4, the second display area A2 may be formed widely at one end (for example, an upper end portion) of the display device 100. In FIG. 4, at least one second display area A2 is arranged only on a front surface upper end portion of the display device 100, but the disclosure is not limited thereto. According to some example embodiments, one or a plurality of second display areas A2 may be provided, and may be arranged adjacent to or distributed anywhere in the display area DA. For example, according to some example embodiments in which the display area DA is formed on the side surface edge, the rear surface, and/or the like of the display device 100, a portion of the second display areas A2 may be formed in the display area DA of the side surface edge and/or the rear surface of the display device 100.

The sensor SR arranged to overlap the second display area A2 may be an optical part. That is, the sensor SR may be a part that receives light or emits light. The sensor SR may include, for example, a fingerprint sensor, an image sensor, a camera, a strobe, an optical sensor, an illumination sensor, a proximity sensor, an RGB sensor, an infrared sensor, an indicator, a solar panel, and the like. However, the sensor SR is not limited to the optical part, and may include various parts such as an ultrasonic sensor, a microphone, an environmental sensor (for example, a barometer, a hygrometer, a thermometer, a radiation detection sensor, a heat detection sensors, or the like), a chemical sensor (a gas detection sensor, a dust sensor, an odor detection sensor, or the like). According to some example embodiments of the disclosure, the sensor SR may include a plurality of sensors overlapping the second display area A2. Here, the plurality of sensors may include a camera, a proximity sensor, and an illuminance sensor arranged side by side.

The above-described sensor SR may be arranged to face (or correspond to) at least one area of the display area DA, for example, the second display area A2, in a surface mount device (SMD) method on a separate base substrate BS formed of a plastic or metal material, such as a bracket, or a case.

The second display area A2 may transmit a signal (for example, ray or light) input to the sensor SR. In order to improve transmittance of the signal, transmittance of the second display area A2 may be greater than that of the first display area A1. Here, each of the transmittance of the second display area A2 and the transmittance of the first display area A1 may be a degree that light transmits per unit area (a preset area, or the same area). For example, the transmittance may be a ratio of light transmitting the display panel DP to light incident on a unit area of the display panel DP. Therefore, the second display area A2 having a relatively high transmittance may transmit the signal (for example, ray or light) better than the first display area A1.

Hereinafter, a pixel arranged in the first display area A1 is defined as the first pixel PXL1, and a pixel arranged in the second display area A2 is defined as the second pixel PXL2.

For example, the second pixels PXL2 in the second display area A2 may be formed at a density (or pixel density) less than that of the first pixels PXL1 in the first display area A1. A gap of the second pixels PXL2 formed at a low density may better transmit the signal (for example, ray or light) by forming a physical and/or optical aperture, for example, a transmission window.

Each of the pixels PXL1 and PXL2 may include a light emitting element that emits light. The light emitting element may be, for example, an organic light emitting diode, but the disclosure is not limited thereto. According to some example embodiments, the light emitting element may be an inorganic light emitting element including an inorganic light emitting material or a light emitting element (a quantum dot display element) that emits light by changing a wavelength of emitted light using a quantum dot.

A touch sensor TS and a window WD may be arranged on the display panel DP including the above-described components.

The touch sensor TS may include touch electrodes. The touch sensor TS may arranged on an image display surface of the display panel DP to receive a user's touch input and/or hover input. The touch sensor TS may sense a touch capacitance by contact and/or proximity of a separate input means such as a user's hand or a conductor similar thereto to recognize the touch input and/or hover input of the display device 100. Here, the touch input may mean that the display device 100 is directly touched (or contacted) by a user's hand or a separate input means, and the hover input may mean that a user's hand or a separate input means is near the display 100 including the touch sensor TS but is not touching the display device 100.

In addition, the touch sensor TS may sense a user's touch operation and may move an object displayed on the display device 100 from an original displayed location to another location in response to the touch operation. Here, the touch operation may include at least one of a single touch, a multi-touch, or a touch gesture. For example, there may be various touch operations including a specific gesture, such as enlarging or reducing a text or an image by moving a user's finger at a certain distance in a state in which the user's finger touches a touch surface of the touch sensor TS.

The window WD is a member or component formed or arranged on an uppermost end of the display device 100 including the display panel DP and may be a transparent (or substantially transparent or translucent) light-transmitting substrate. The window WD may transmit an image from the display panel DP and alleviate an external impact, thereby preventing or reducing damage to the display panel DP due to an external impact. For example, the external impact may be a force from the outside that may be expressed by pressure, stress, or the like, and may mean a force that may cause a defect in the display panel DP. The window WD may include a rigid or flexible substrate, and a configuration material of the window WD is not particularly limited.

Figure 7:
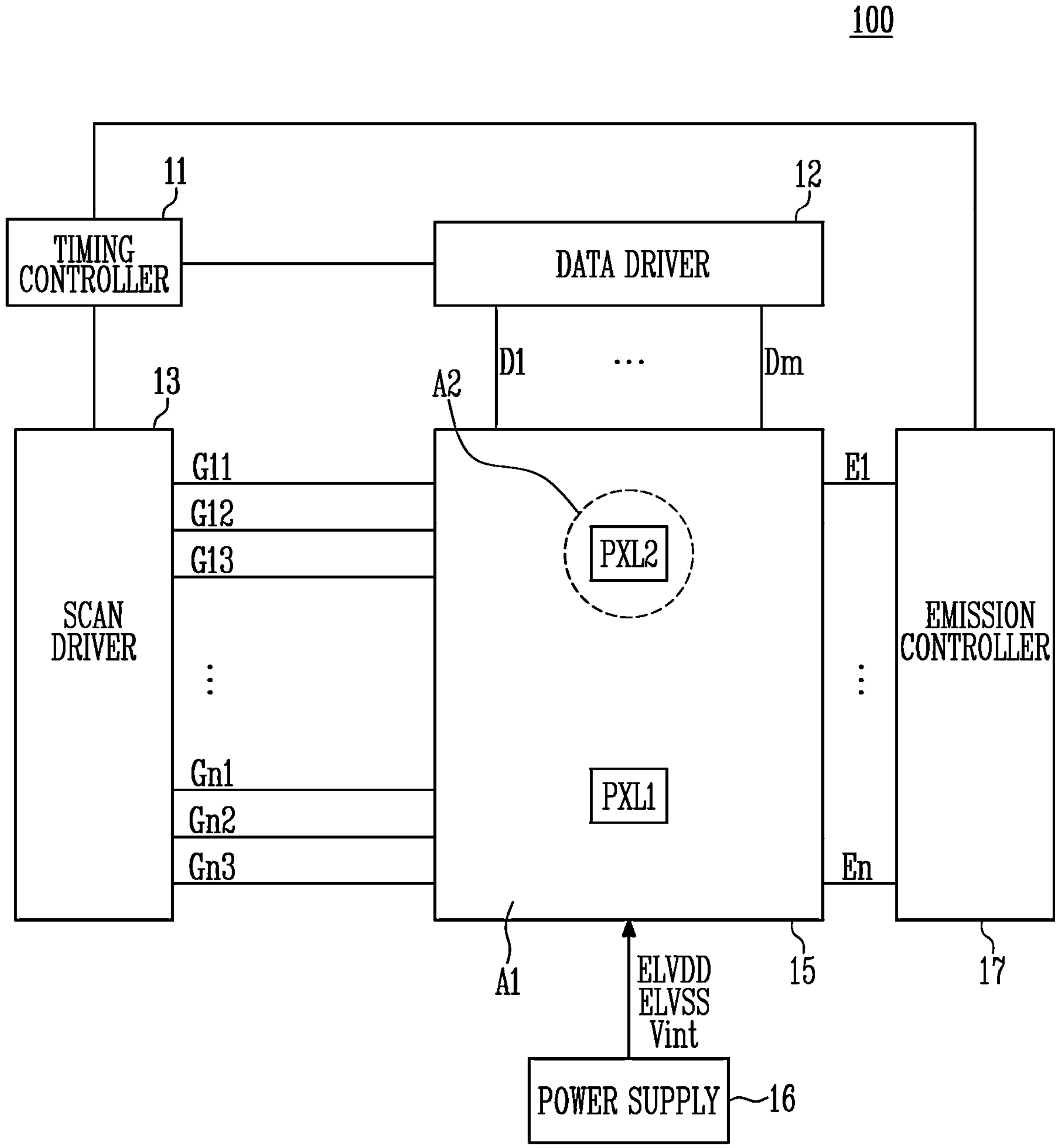
FIG. 7 is a block diagram schematically illustrating the display device according to some example embodiments of the disclosure.

FIG. 7 is a block diagram schematically illustrating the display device according to some example embodiments of the disclosure.

Referring to FIG. 7, the display device 100 according to some example embodiments of the disclosure may include a timing controller 11, a data driver 12, a scan driver 13, a display unit 15, a power supply 16, and an emission controller 17.

The timing controller 11 may provide grayscale values for each frame, a control signal, and the like to the data driver 12. In addition, the timing controller 11 may provide a clock signal, a control signal, and the like to the scan driver 13.

The data driver 12 may generate data voltages to be provided to data lines D1 to Dm by using the grayscale values, the control signal, and the like received from the timing controller 11. For example, the data driver 12 may sample the grayscale values using the clock signal, and may apply the data voltages corresponding to the grayscale values to the data lines D1 to Dm in a pixel row (for example, pixels connected to the same scan line) unit. m may be a natural number.

The scan driver 13 may receive the clock signal, a scan start signal, and the like from the timing controller 11 and generate scan signals to be provided to scan lines G11, Gn1, G12, Gn2, G13, and Gn3. Here, n may be a natural number.

According to some example embodiments, the scan driver 13 may include a plurality of sub scan drivers. For example, a first sub scan driver may provide scan signals for first scan lines G11 and Gn1, a second sub scan driver may provide scan signals for second scan lines G12 and Gn2, and a third sub scan driver may provide scan signals for third scan lines G13 and Gn3. Each the sub scan drivers may include a plurality of scan stage circuits connected in a form of a shift register. For example, the scan signals may be generated in a method of sequentially transferring a pulse of a turn-on level of the scan start signal supplied to the scan start line to a next scan stage circuit.

The emission controller 17 may receive a clock signal, an emission stop signal, and the like from the timing controller 11 and generate emission control signals to be provided to emission control lines E1 to En. For example, the emission controller 17 may sequentially provide the emission control signals having a pulse of a gate-off level to the emission control lines E1 to En. For example, the emission controller 17 may be configured in a form of a shift register, and generate the emission control signals in a method of sequentially transferring the pulse of the gate-off level of the emission stop signal to a next stage circuit under control of the clock signal.

The display unit 15 includes the pixels PXL1 and PXL2. As described above, the display unit 15 may include the first display area A1 defined as the area in which the first pixels PXL1 are arranged and the second display area A2 defined as the area in which the second pixels PXL2 are arranged.

Figure 9:
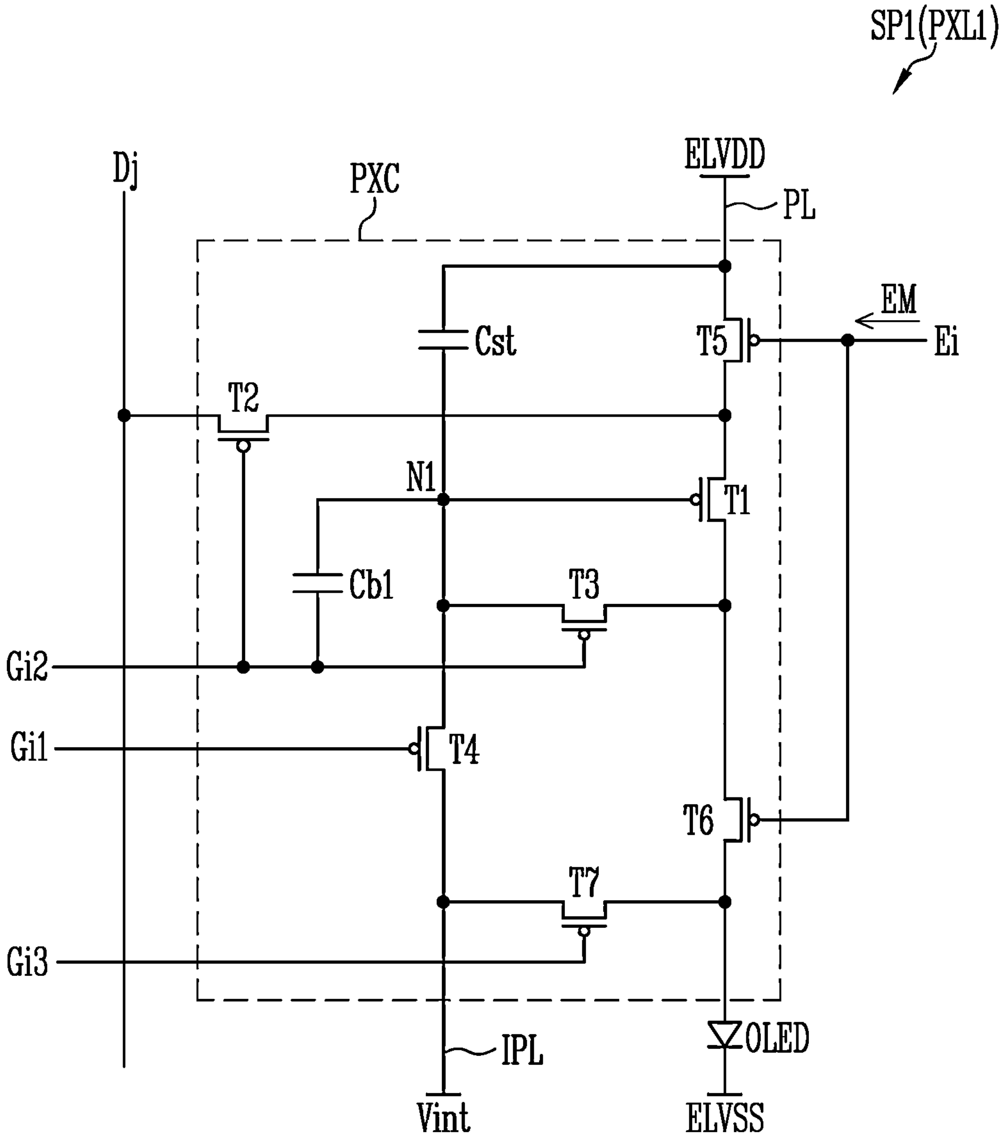
FIG. 9 is a circuit diagram illustrating an electrical connection relationship between components included in a first sub pixel of FIG. 8 according to an embodiment.

According to some example embodiments, each of the first pixels PXL1 may be connected to corresponding data line Dj (see FIG. 9), scan lines Gi1, Gi2, and Gi3 (see FIG. 9), and emission control line Ei (see FIG. 9). Each of the second pixels PXL2 may be connected to corresponding data line Dq (see FIG. 15), scan lines Gp1, Gp2, and Gp3 (see FIG. 15), and emission control line Ep (see FIG. 15).

The power supply 16 may receive an external input voltage and convert the external input voltage to provide a power voltage to an output terminal. For example, the power supply 16 generates a first power voltage (a high-level power voltage) of a first power ELVDD and a second power voltage (a low-level power voltage) of a second power ELVSS based on the external input voltage. In the present specification, the first power ELVDD and the second power ELVSS may have different voltage levels. The power supply 16 may provide an initialization voltage Vint for initializing a gate electrode of a driving transistor or for initializing an anode of a light emitting element OLED (see FIG. 9) for each of the pixels PXL1 and PXL2.

The power supply 16 may receive the external input voltage from a battery or the like and boost the external input voltage to generate a power voltage that is greater than the external input voltage. For example, the power supply 16 may be configured of a power management integrated chip (PMIC). For example, the power supply 16 may be configured of an external DC/DC IC.

Figure 8:
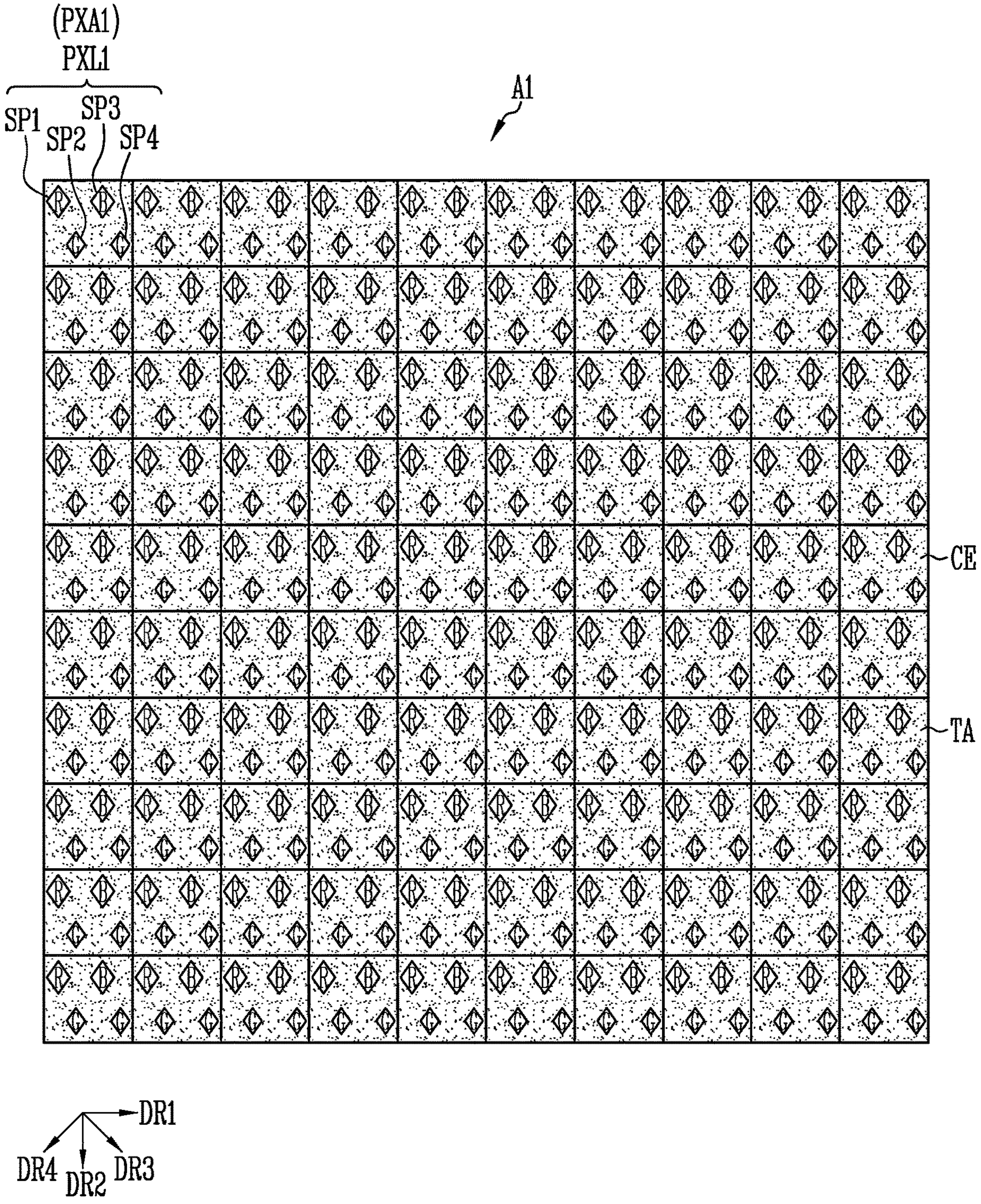
FIG. 8 is a plan view schematically illustrating a first display area according to some example embodiments of the disclosure.

FIG. 8 is a plan view schematically illustrating the first display area according to some example embodiments of the disclosure. FIG. 9 is a circuit diagram illustrating an electrical connection relationship between components included in the first sub pixel of FIG. 8 according to some example embodiments.

In FIG. 9, an active sub pixel, which is connected to i-th scan lines Gi1, Gi2, and Gi3 arranged in an i-th horizontal pixel row of the first display area A1, an i-th emission control line Ei, and a j-th data line Dj arranged in a j-th vertical pixel column and includes seven transistors, for example, a first sub pixel SP1 of FIG. 9, is shown.

Referring to FIGS. 8 and 9, the first display area A1 is an area of the display area DA, and a plurality of first pixels PXL1 may be arranged.

Each of the first pixel PXL1 may include at least one sub pixel. For example, the first pixel PXL1 may include four sub pixels SP1, SP2, SP3, and SP4. The first sub pixel SP1 and a third sub pixel SP3 may be red pixels R emitting red light or blue pixels B emitting blue light, and a second sub pixel and a fourth sub pixel SP4 may be a green pixel G emitting green light. However, the disclosure is not limited thereto, and according to some example embodiments, two sub pixels among the sub pixels SP1, SP2, SP3, and SP4 may be green pixels G emitting green light, and each of the other two sub pixels may be a red pixel R emitting red light or a blue pixel B emitting blue light.

According to some example embodiments, the first sub pixel SP1 formed of the red pixel R and the third sub pixel SP3 formed of the blue pixel B may be alternately arranged in a first direction DR1, for example, a horizontal direction or a row direction to form a first pixel row. The second sub pixel SP2 and the fourth sub pixel SP4 formed of the green pixel G may be arranged in the first direction DR1 to form a second pixel row. According to some example embodiments, a pixel arrangement sequence of the first pixel row may be different from each other.

A plurality of first pixel rows and second pixel rows may be provided and may be alternately arranged in the second direction DR2, for example, in a vertical direction or a column direction.

In the first display area A1, two first sub pixels SP1 formed of the red pixel R and two third sub pixels SP3 formed of the blue pixel B may be located in a diagonal direction centering on one second sub pixel SP2 formed of the green pixel G. For example, the third sub pixel SP3 formed of the blue pixel B may be arranged in a third direction DR3 (for example, a direction inclined to the first direction DR1) and the first sub pixel SP1 formed of the red pixel R may be arranged in a fourth direction DR4 (for example, a direction inclined to the second direction DR2) centering on one second sub pixel SP2.

The first sub pixel SP1 formed of the red pixel R and the third sub pixel SP3 formed of the blue pixel B may face each other centering on one second sub pixel SP2 formed of the green pixel G. Each of the sub pixels SP1, SP2, SP3, and SP4 may have a rhombus structure, and are formed with the same or similar areas. However, the disclosure is not limited thereto, and the sub pixels SP1, SP2, SP3, and SP4 may have structures different from each other, and some of the sub pixels SP1, SP2, SP3, and SP4 may have an emission area (or size) less or greater than that of remaining sub pixels. In FIG. 8, the first sub pixel SP1 and the third sub pixel SP3 have the area (or size) different from that of the second sub pixel SP2 and the fourth sub pixel SP4.

According to some example embodiments of the disclosure, the first display area A1 may include a first pixel area PXA1 in which each of the first pixel PXL1*s* is arranged. That is, a plurality of first pixel areas PXA1 may be arranged in the first display area A1. The first pixel areas PXA1 may be arranged in a number (e.g., a set or predetermined number) along the first direction DR1 and the second direction DR2 according to resolution of the display panel DP. Color light and/or white light may be implemented by a combination of sub pixels included in each first pixel area PXA1.

In the first display area A1, the first pixels PXL1 each including the first and second sub pixels SP1 and SP2 may be arranged at a first density. The first density may be, for example, a density at which the first pixels PXL1 are densely arranged in the first display area A1 and thus the total area of the first display area A1 and the area at which the first pixels PXL1 are arranged are the same or substantially the same. Here, the first density may be defined as a total number of the first pixels PXL1 per unit area (pixel per inch (PPI)) of the first display area A1.

Each of the sub pixels SP1, SP2, SP3, and SP4 may include a pixel circuit including a light emitting element that emits light and at least one transistor for driving the light emitting element. The pixel circuits of each of the sub pixels SP1, SP2, SP3, and SP4 may have substantially similar structure or the same structure. Accordingly, for convenience of description, description of the pixel circuit of each of the sub pixels SP1, SP2, SP3, and SP4 may be replaced with description for a pixel circuit PXC of the first sub pixel SP1 with reference to FIG. 9.

As shown in FIG. 9, the first sub pixel SP1 of the first pixel PXL1 may include the light emitting element OLED and the pixel circuit PXC connected to the light emitting element OLED to drive the light emitting element OLED. Here, the pixel circuit PXC may include first to seventh transistors T1 to T7, the light emitting element OLED, a storage capacitor Cst, and a first boosting capacitor Cb1. However, in the disclosure, configurations included in the pixel circuit PXC of the first sub pixel SP1 are not limited to the above-described embodiments.

A first electrode of the first transistor T1 (a driving transistor) may be connected to the first power ELVDD through the fifth transistor T5, and a second electrode may be connected to the anode of the light emitting element OLED through the sixth transistor T6. The first electrode corresponds to any one of a source electrode and a drain electrode, and the second electrode corresponds to the other one of the source electrode and the drain electrode. A gate electrode of the first transistor T1 may be connected to a first node N1. The first transistor T1 may control a current amount flowing from the first power ELVDD to the second power ELVSS through the light emitting element OLED in correspondence with a voltage of the first node N1.

The second transistor T2 (a switching transistor) may be connected between the j-th data line Dj and the first electrode of the first transistor T1. In addition, a gate electrode of the second transistor T2 may be connected to the second scan line Gi2. The second transistor T2 may be turned on when the scan signal is supplied to the second scan line Gi2 to electrically connect the j-th data line Dj and the first electrode of the first transistor T1 to each other.

The third transistor T3 (a diode connection transistor) may be connected between the second electrode of the first transistor T1 and the first node N1. In addition, a gate electrode of the third transistor T3 may be connected to the second scan line Gi2. The third transistor T3 may be turned on when a scan signal of a gate-on voltage is supplied to the second scan line Gi2 to electrically connect the second electrode of the first transistor T1 and the first node N1 to each other. Therefore, when the third transistor T3 is turned on, the first transistor T1 may be connected in a form of a diode.

The fourth transistor T4 (a gate initialization transistor) may be connected between the first node N1 and an initialization power line IPL to which the initialization power Vint is applied. In addition, a gate electrode of the fourth transistor T4 may be connected to the first scan line Gi1. The fourth transistor T4 may be turned on when the scan signal is supplied to the first scan line Gi1 to supply a voltage of the initialization power Vint to the first node N1.

The fifth transistor T5 (a first emission transistor) may be connected between the first transistor T1 and a power line PL to which the first power ELVDD is applied. In addition, a gate electrode of the fifth transistor T5 may be connected to the i-th emission control line Ei. The fifth transistor T5 may be turned off when an emission control signal of a gate-off voltage is supplied to the i-th emission control line Ei, and may be turned on in other cases.

The sixth transistor T6 (a second emission transistor) may be connected between the first transistor T1 and the light emitting element OLED. In addition, a gate electrode of the sixth transistor T6 may be connected to the i-th emission control line Ei. The sixth transistor T6 may be turned off when an emission control signal of a gate-off voltage (for example, a high level voltage) is supplied to the i-th emission control line Ei, and may be turned on in other cases.

The seventh transistor T7 (an anode initialization transistor) may be connected between the initialization power line IPL to which the initialization power Vint is applied and a first electrode, for example, the anode of the light emitting element OLED. In addition, a gate electrode of the seventh transistor T7 may be connected to the third scan line Gi3. The seventh transistor T7 may be turned on when a scan signal of a gate-on voltage (for example, a low level voltage) is supplied to the third scan line Gi3 to supply the voltage of the initialization power Vint to the anode of the light emitting element OLED. Here, the voltage of the initialization power Vint may be set to a voltage less than the data signal. That is, the voltage of the initialization power Vint may be set to be equal to or less than a minimum voltage of the data signal.

The storage capacitor Cst may be connected between the power line PL to which the first power ELVDD is applied and the first node N1. The storage capacitor Cst may store a voltage corresponding to the data signal and a threshold voltage of the first transistor T1.

The first boosting capacitor Cb1 may be connected between the first node N1 and the second scan line Gi2. The first boosting capacitor Cb1 may mean a capacitor generated by a coupling phenomenon generated in an area where an electrode electrically connected to the first node N1 and the second scan line Gi2 overlap on a plane and a fringe phenomenon in an area where the electrode electrically connected to the first node N1 and the second scan line Gi2 do not overlap on the plane. The first boosting capacitor Cb1 may be formed between the gate electrode of the first transistor T1 electrically connected to the first node N1 and the gate electrode of the second transistor T2 electrically connected to the second scan line Gi2. In addition, the first boosting capacitor Cb1 may be formed between the gate electrode of the first transistor T1 electrically connected to the first node N1 and the gate electrode of the third transistor T3 electrically connected to the second scan line Gi2.

According to some example embodiments, each of the transistors T1 to T7 may be a P-type (PMOS) transistor. Channels of the transistors T1 to T7 may be configured of poly silicon. A poly silicon transistor may be a low temperature poly silicon (LTPS) transistor. The poly silicon transistor has high electron mobility, and thus has a fast driving characteristic.

According to some example embodiments, the transistors T1 to T7 may be N-type (NMOS) transistors. At this time, the channels of the transistors T1 to T7 may be configured of an oxide semiconductor. An oxide semiconductor transistor may be processed at a low temperatures and have charge mobility less than that of the poly silicon. Therefore, a leakage current amount generated in a turn-off state of the oxide semiconductor transistors is less than that of the poly silicon transistors.

Figure 25:
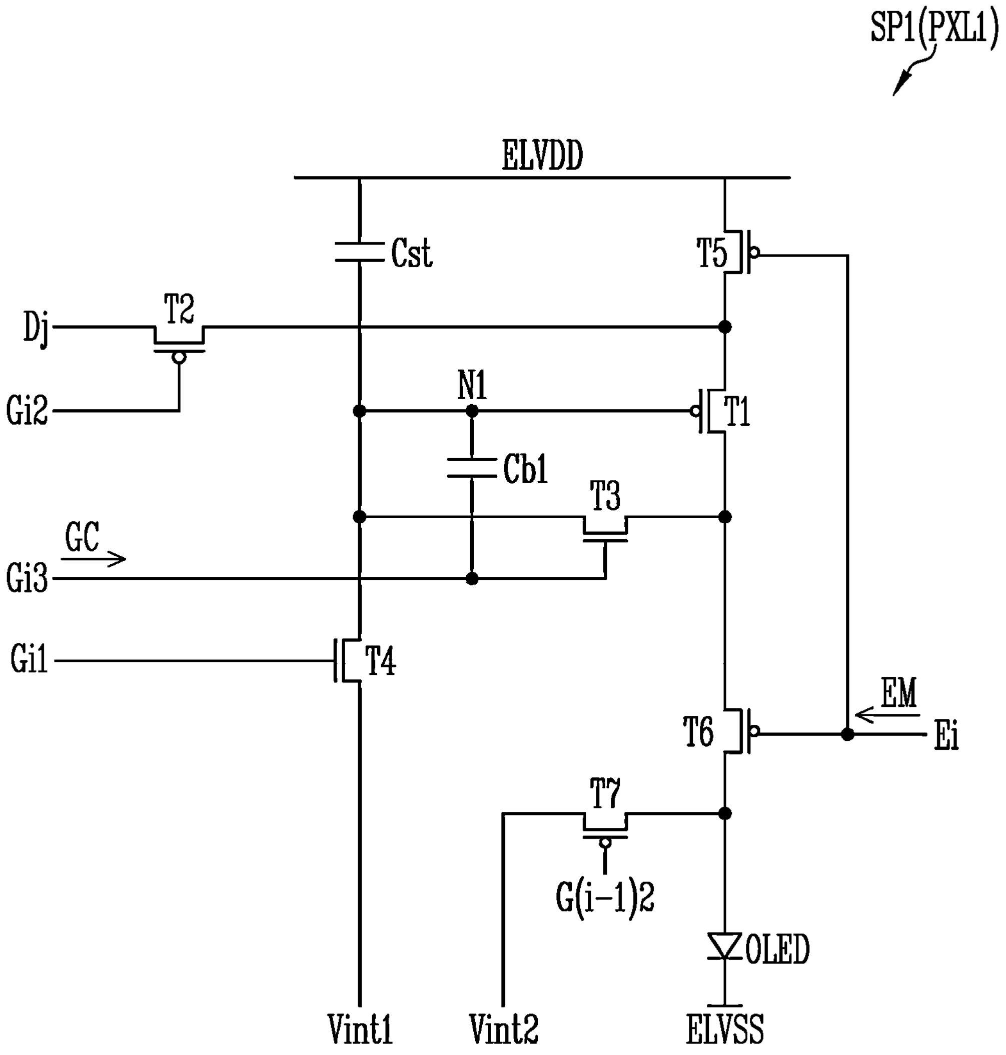
FIG. 25 is a circuit diagram illustrating an electrical connection relationship between components included in a sub pixel of a first pixel shown in FIG. 24 according to some example embodiments.

According to some example embodiments, some transistors (for example, T1, T2, T5, T6, and T7) may be P-type transistors, and the remaining transistors (for example, T3 and T4) may be N-type transistors (see FIG. 25).

The anode of the light emitting element OLED may be connected to the first transistor T1 through the sixth transistor T6, and a cathode may be connected to the second power ELVSS. The light emitting element OLED generates light of a luminance (e.g., a set or predetermined luminance) in correspondence with the current amount supplied from the first transistor T1. A voltage value of the first power ELVDD may be set to be greater than a voltage value of the second power ELVSS so that a current flows through the light emitting element OLED.

The light emitting element OLED may be, for example, an organic light emitting diode. The light emitting element OLED may emit light in one of red, green, and blue colors. However, the disclosure is not limited to this.

Meanwhile, a structure of the first sub pixel SP1 in the first pixels PXL1 is not limited to the embodiments illustrated with respect to FIG. 9. For example, the pixel circuit PXC of currently known various structures may be applied to the first sub pixel SP1 in the first pixels PXL1.

Figure 10:
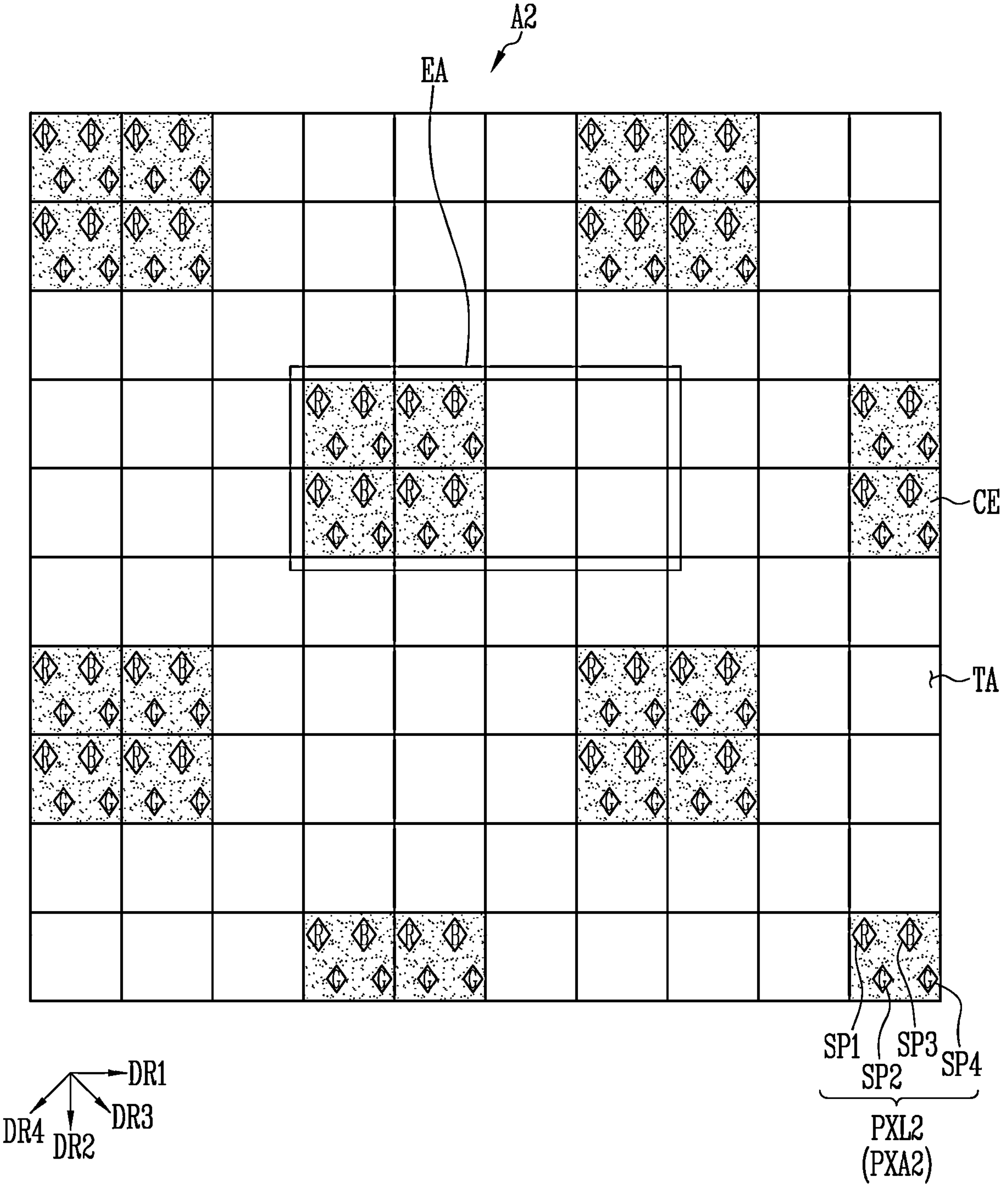
FIG. 10 is a plan view schematically illustrating a second display area according to some example embodiments of the disclosure.
Figure 11:
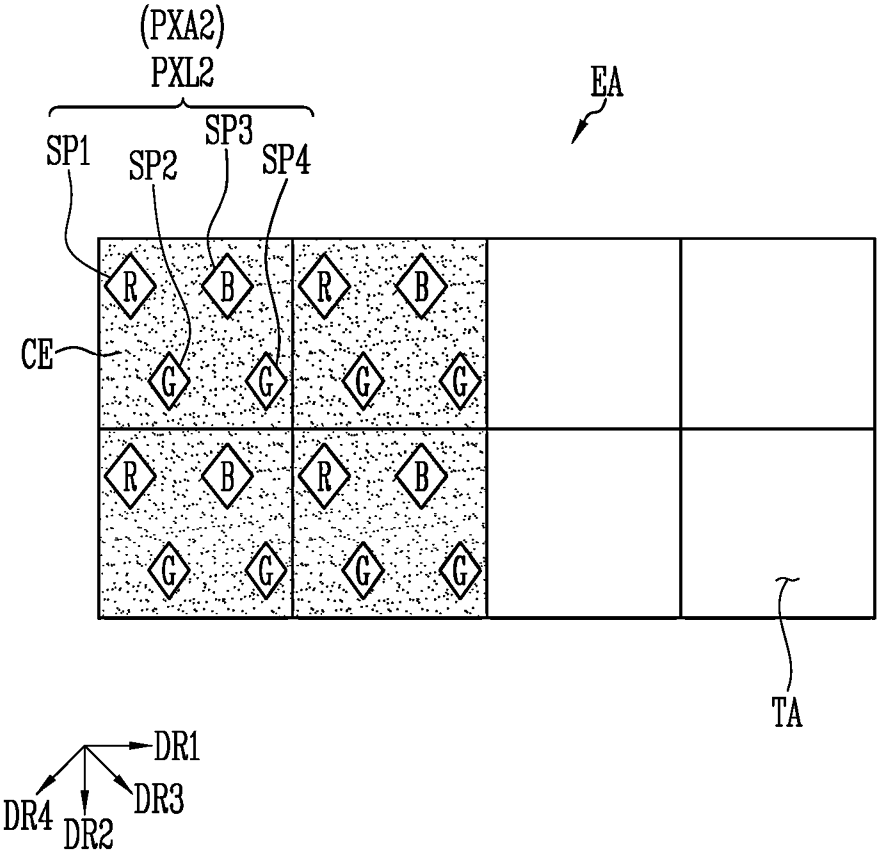
FIG. 11 is an enlarged schematic plan view of an EA portion of FIG. 10.
Figure 12:
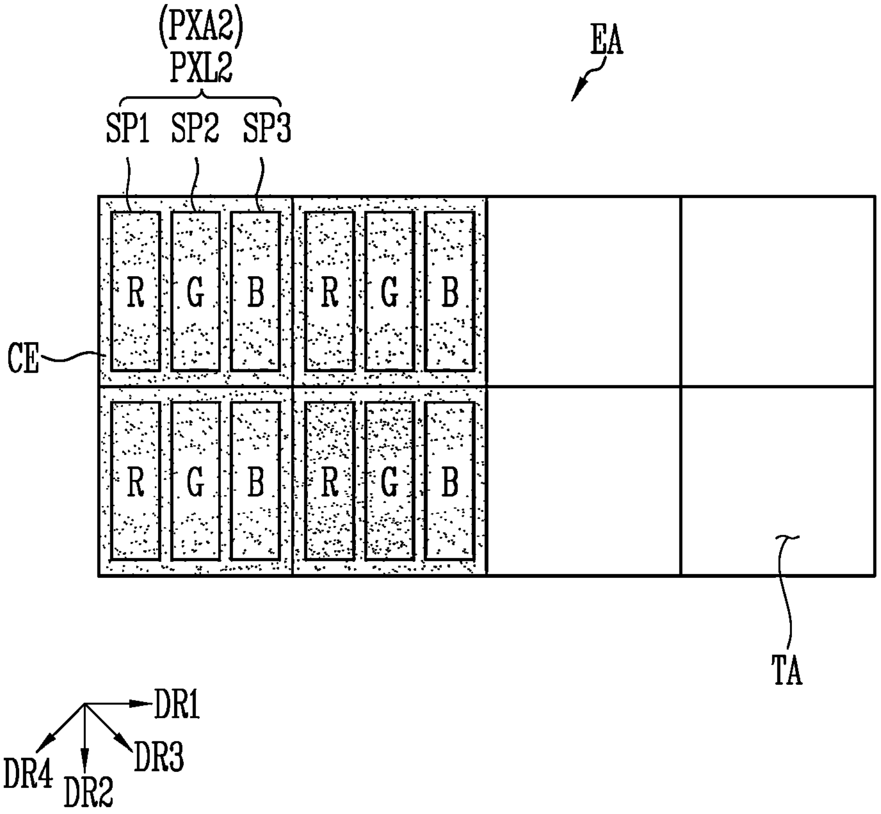
FIGS. 12 to 14 are modified examples of FIG. 11.
Figure 13:
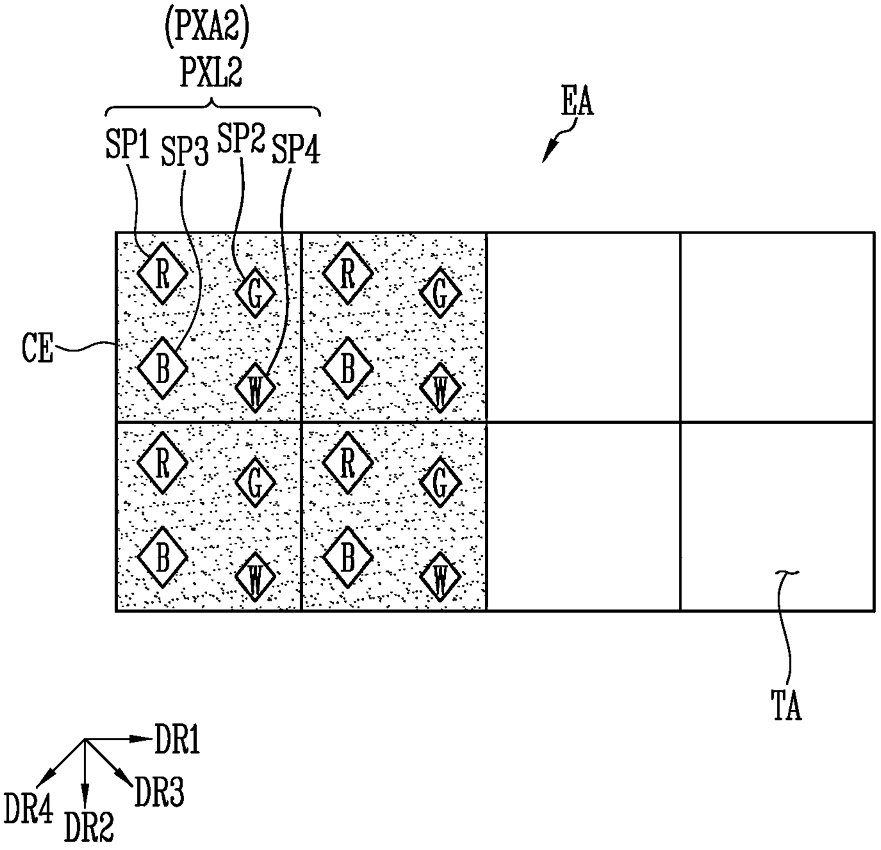
Figure 14:
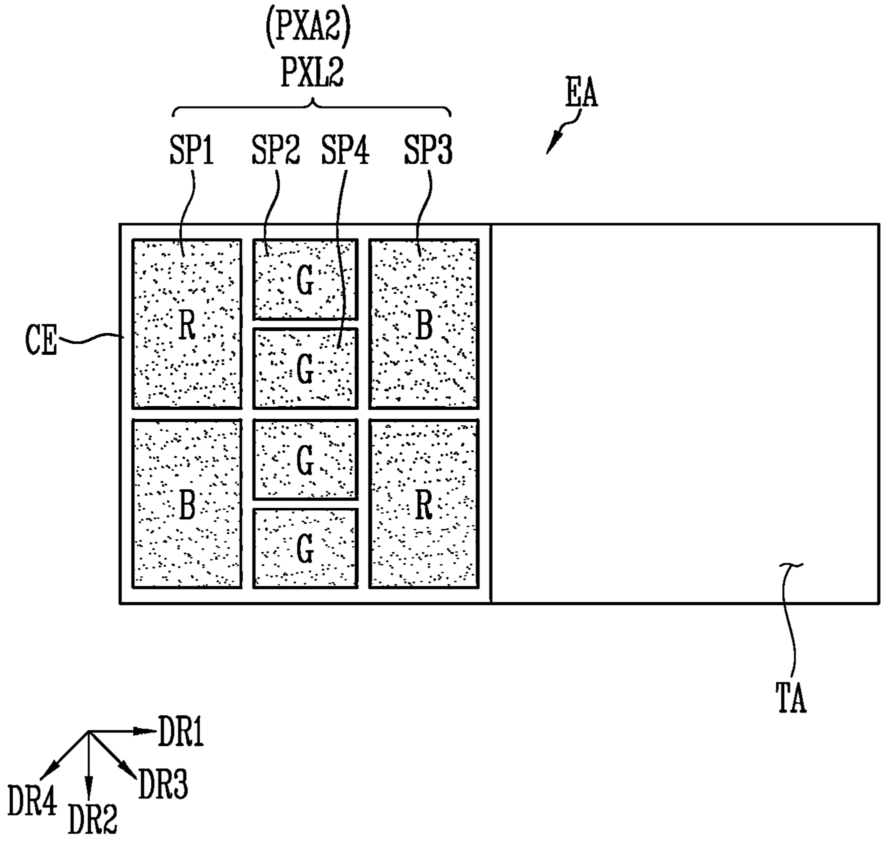
Figure 15:
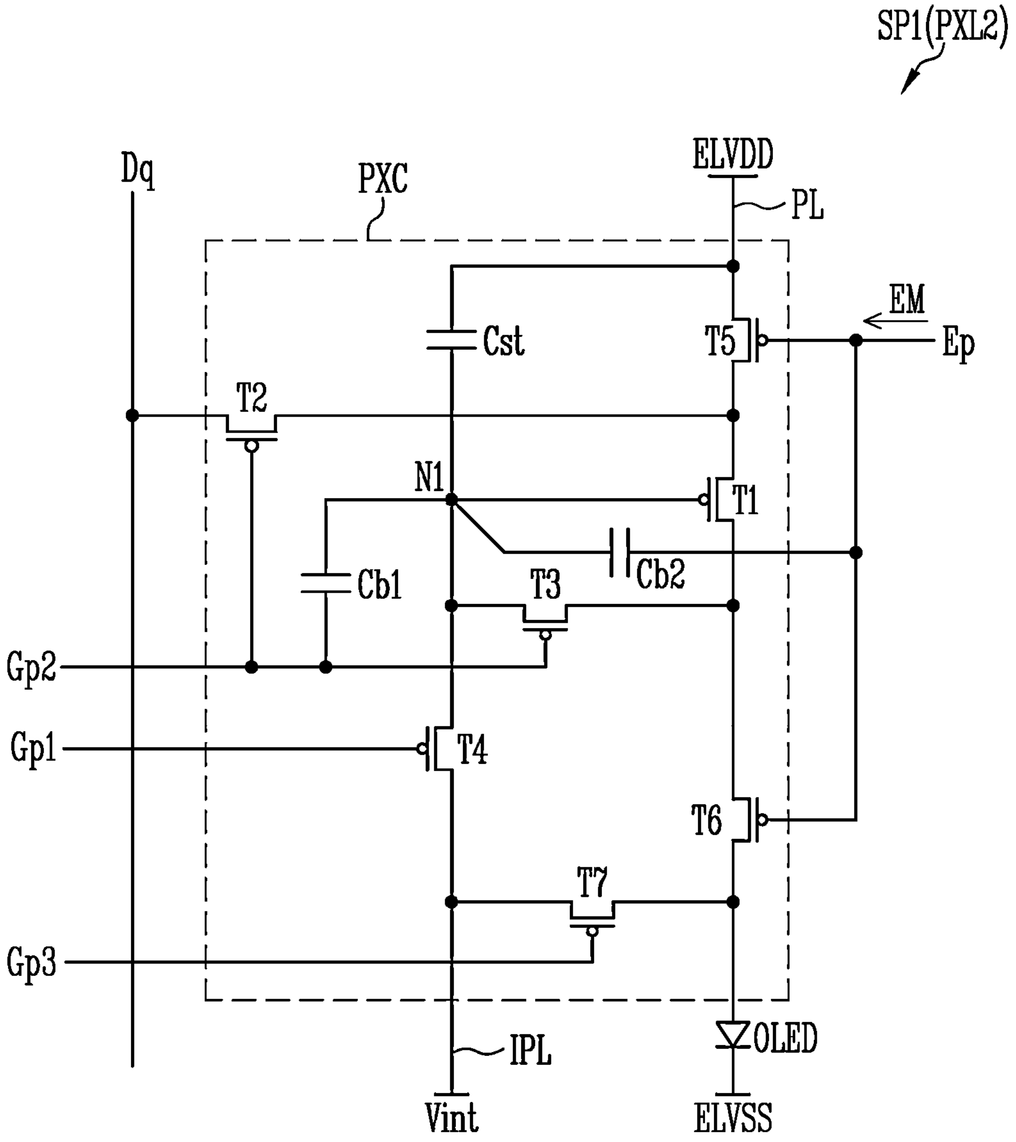
FIG. 15 is a circuit diagram illustrating an electrical connection relationship between components included in a first sub pixel of FIG. 10 according to some example embodiments.

FIG. 10 is a plan view schematically illustrating the second display area according to some example embodiments of the disclosure. FIG. 11 is an enlarged schematic plan view of an EA portion of FIG. 10. FIGS. 12 to 14 are modified examples of FIG. 11. FIG. 15 is a circuit diagram illustrating an electrical connection relationship between components included in the first sub pixel of FIG. 10 according to some example embodiments.

The second pixels PXL2 may be arranged at a second density in the second display area A2. The second density may be set to be less than the first density. Here, the second density may be defined as the total number of second pixels PXL2 per unit area (pixel per inch (PPI)) of the second display area A2. In the following description, the first pixels PXL1 and the second pixels PXL2 are collectively referred to as the pixels PXL1 and PXL2.

As the second pixels PXL2 in the second display area A2 are arranged at a relatively low density compared to the first pixels PXL1 of the first display area A1, the transmittance of the second display area A2, for example, light transmittance may be greater than light transmittance of the first display area A1. According to some example embodiments, the first density of the first pixels PXL1 may be greater than the second density of the second pixels PXL2 about 4 to 16 times.

According to some example embodiments, each of the first pixels PXL1 in the first display area A1 may emit light with the same luminance, and each of the second pixels PXL2 in the second display area A2 may emit light with the same luminance. However, as the first pixels PXL1 and the second pixels PXL2 are arranged at different densities in the first display area A1 and the second display area A2, the first pixels PXL1 and the second pixels PXL2 may emit light at different luminance according to an area. For example, the first pixels PXL1 in the first display area A1 may emit light at a first luminance, and the second pixels PXL2 in the second display area A2 may emit light at a second luminance.

Because the second pixels PXL2 are arranged at a density less than that of the first pixels PXL1, the second pixels PXL2 may be set to emit light at a luminance greater than that of the first pixels PXL1, so that a boundary between the first display area A1 and the second display area A2 is not easily recognized to the user.

According to some example embodiments, a relationship between the first luminance of the first pixels PXL1 and the second luminance of the second pixels PXL2 may be inversely proportional to a density relationship. For example, the second luminance of the second pixels PXL2 may be greater than the first luminance of the first pixels PXL1 about 4 to 16 times.

The second display area A2 may include a plurality of pixel rows and a plurality of pixel columns. According to some example embodiments, each pixel row includes pixels (or sub pixels) arranged in the first direction DR1. Each pixel column includes pixels (or sub pixels) arranged in the second direction DR2. Pixels (or sub pixels) in one pixel row may be connected to different data lines. Pixels (or sub pixels) included in each pixel column may be connected to the same data line for each pixel column.

A configuration of the first pixels PXL1 in the first display area A1 and a configuration of the second pixels PXL2 in the second display area A2 may be different from each other.

For example, a material of signal lines connected to the first pixels PXL1 of the first display area A1 and a material of signal lines connected to the second pixels PLX2 of the second display area A2 may be different from each other. For example, the material of the signal lines connected to the first pixels PXL1 of the first display area A1 may be formed of opaque metal, and the material of the signal lines connected to the second pixels PLX2 of the second display area A2 may be formed of transparent metal. According to some example embodiments, the signal lines connected to the pixels PXL1 and PXL2 in the first display area A1 and the second display area A2 may be configured of one of opaque metal and transparent metal, and a ratio of the signal lines formed of the transparent metal in the second display area A2 may be greater than a ratio of the signal lines formed of the transparent metal in the first display area A1. According to some example embodiments of the disclosure, light transmittance of the transparent metal may be greater than light transmittance of the opaque metal, for example, a reflective metal.

As another example, a material of the anode of the light emitting element OLED included in the first pixels PXL1 of the first display area A1 and a material of the anode of the light emitting device OLED included in the second pixels PXL2 of the second display area A2 may be different from each other. For example, the material of the anode of the light emitting element OLED included in the first pixels PXL1 of the first display area A1 may be configured of opaque metal, and the material of the anode of the light emitting device OLED included in the second pixels PXL2 of the second display area A2 may be formed of transparent metal.

As further another example, a ratio of the cathode of the light emitting elements OLDE included in the first pixels PXL1 of the first display area A1 and a ratio of the cathode of the light emitting elements OLED included in the second pixels PXL2 of the second display area A2 may be different from each other. For example, the ratio of the cathode of the light emitting elements OLED included in the second pixels PXL2 of the second display area A2 may be less than the ratio of the cathode of the light emitting elements OLED included in the second pixels PXL2 of the second display area A2.

As further another example, a layout (for example, a disposition relationship of the components included in the pixel circuit PXC) of the first pixels PXL1 and a layout of the second pixels PXL2 may be different from each other. For example, the signal lines connected to the second pixels PXL2 may be designed to be narrower than the signal lines connected to the first pixels PXL1, or the signal lines connected to the second pixels PXL2 may be arranged to overlap with an insulating layer interposed therebetween. Accordingly, as a distance between the signal lines in the second display area A2 is secured, the area occupied by the signal lines may be reduced, and thus the light transmittance of the second display area A2 may be improved.

Each of the second pixels PXL2 may include four sub pixels SP1, SP2, SP3, and SP4. The first sub pixel SP1 and the third sub pixel SP3 may be red pixels R emitting red light or blue pixels B emitting blue light, and the second sub pixels SP2 and the fourth sub pixel SP4 may be green pixels G emitting green light. Each of the second pixels PXL2 may be arranged in the second pixel area PXA2 and may implement color light or white light by combining light emitted from each of the sub pixels SP1, SP2, SP3, and SP4. As described above, the four sub pixels SP1, SP2, SP3, and SP4 configures one second pixel PXL2, but embodiments according to the present disclosure are not limited thereto.

According to some example embodiments, as shown in FIG. 12, each of the second pixels PXL2 may include first to third sub pixels SP1 to SP3 arranged in the same pixel row along the first direction DR1. The first to third sub pixels SP1 to SP3 may be arranged in each second pixel area PXA2 in an arrangement structure of a stripe shape. The first sub pixel SP1 may be a red pixel R emitting red light, the second sub pixel SP2 may be a green pixel G emitting green light, and the third sub pixel SP3 may be a blue pixel B emitting blue light. In this case, the first to third sub pixels SP1 to SP3 may have a rectangular structure and may be formed to have areas (or sizes) identical or similar to each other.

According to some example embodiments, as shown in FIG. 13, one second pixel PXL2 may include four sub pixels SP1, SP2, SP3, and SP4. The first sub pixel SP1 may be a red pixel R emitting red light, the second sub pixel SP2 may be a green pixel G emitting green light, the third sub pixel SP3 may be a blue pixel B emitting blue light, and the fourth sub pixel SP4 may be a white pixel W emitting white light. The first sub pixel SP1 and the third sub pixel SP3 may be repeatedly arranged along the second direction DR2 to form a first pixel column. The second sub pixel SP2 and the fourth sub pixel SP4 may be repeatedly arranged along the second direction DR2 to form a second pixel column.

According to some example embodiments, as shown in FIG. 14, one second pixel PXL2 may include four sub pixels SP1, SP2, SP3, and SP4. The first sub pixel SP1 may be a red pixel R emitting red light, the second sub pixel SP2 and the fourth sub pixel SP4 may be green pixels G emitting green light, and the third sub pixel SP3 may be a blue pixel B emitting blue light. According to some example embodiments, the first sub pixel SP1 and the third sub pixel SP3 may have a shape in which a length of the second direction DR2 is longer than a length of the first direction DR1, and the second sub pixel SP2 and the fourth sub pixel SP4 may have a shape in which a length of the first direction DR1 is longer than a length of the second direction DR2, but embodiments according to the present disclosure are not limited to the above-described shape. The first sub pixel SP1 and the third sub pixel SP3 may be repeatedly arranged along the second direction DR2 to form a first pixel column. A plurality of second sub pixels SP2 and fourth sub pixels SP4 may be arranged along the second direction DR2 to form a second pixel column. The first sub pixel SP1, the second sub pixel SP2 and the fourth sub pixel SP4 overlapping in the second direction DR2, and the third sub pixel SP3 may be repeatedly arranged along the first direction DR1 to form a first pixel row. According to some example embodiments, an emission area defined by the second sub pixel SP2 and the fourth sub pixel SP4 may overlap one first sub pixel SP1 and the third sub pixel SP3 in the first direction DR1. The first sub pixel SP1 overlapping in the first direction DR1, and the second sub pixel SP2 and the fourth sub pixel SP4 overlapping in the second direction DR2 may be connected to the same scan lines Gp1, Gp2, and Gp3 (see FIG. 15).

Referring to FIG. 15, the first sub pixel SP1 of the second pixel PXL2 may include a light emitting element OLED and a pixel circuit PXC connected to the light emitting element OLED to drive the light emitting element OLED. Here, the pixel circuit PXC may include first to seventh transistors T1 to T7, the light emitting element OLED, a storage capacitor Cst, a first boosting capacitor Cb1, and a second boosting capacitor Cb2. Hereinafter, the pixel circuit PXC in the second pixel PXL2 may have the same or similar connection relationship compared to the pixel circuit PXC in the first pixel PXL1 except that the pixel circuit PXC in the second pixel PXL2 further includes the second boosting capacitor Cb2, and thus repetitive description thereof will be omitted.

The second boosting capacitor Cb2 may be connected between the first node N1 and the emission control line Ep. The second boosting capacitor Cb2 may mean a capacitor generated by a coupling phenomenon generated in an area where an electrode electrically connected to the first node N1 and the emission control line Ep overlap on a plane and a fringe phenomenon in an area where the electrode electrically connected to the first node N1 and the emission control line Ep do not overlap on the plane.

According to some example embodiments, a capacitance of the second boosting capacitor Cb2 in the second pixel PXL2 may be greater than a capacitance of the first boosting capacitor Cb1.

Figure 16:
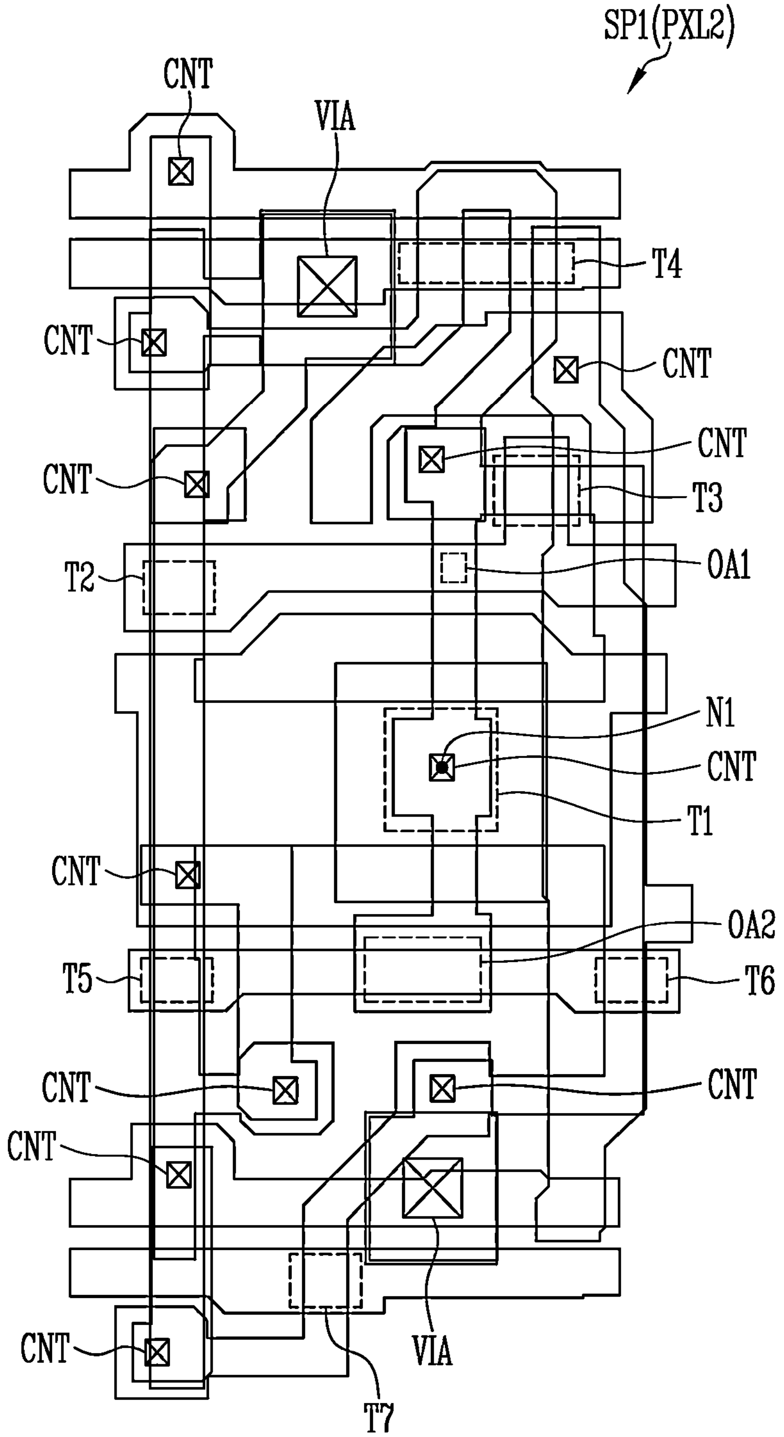
FIG. 16 is a layout diagram of one sub pixel in a second pixel according to some example embodiments of the disclosure.
Figure 17:
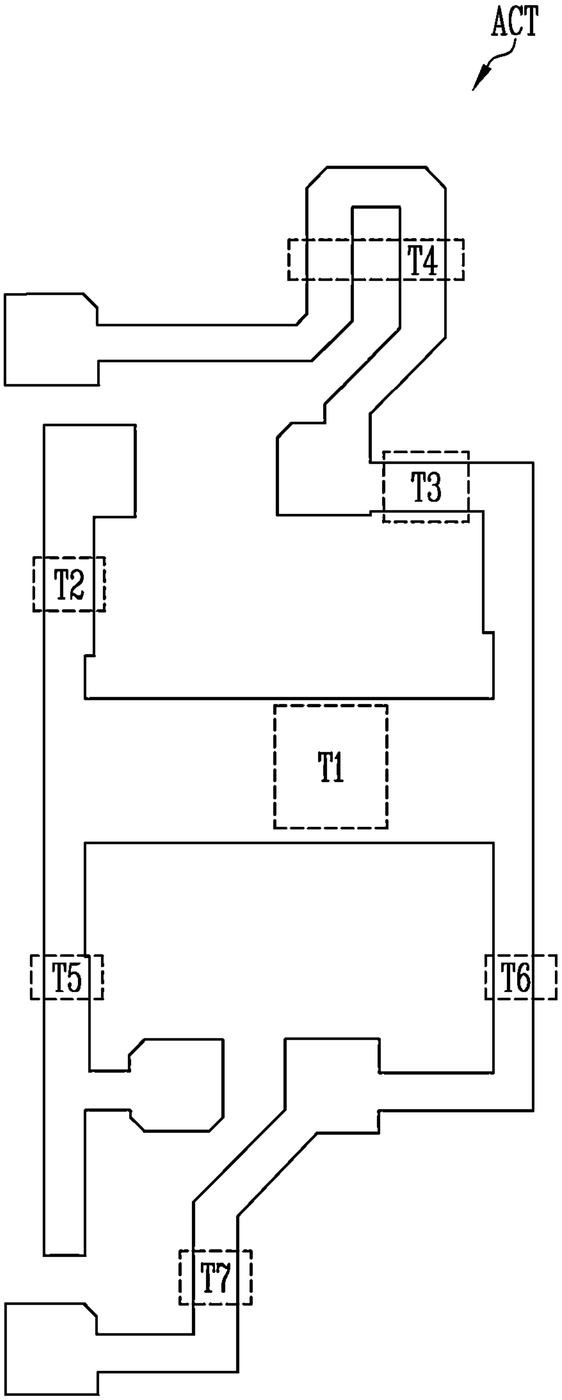
FIG. 17 is a layout diagram of a semiconductor layer of FIG. 16.
Figure 18:
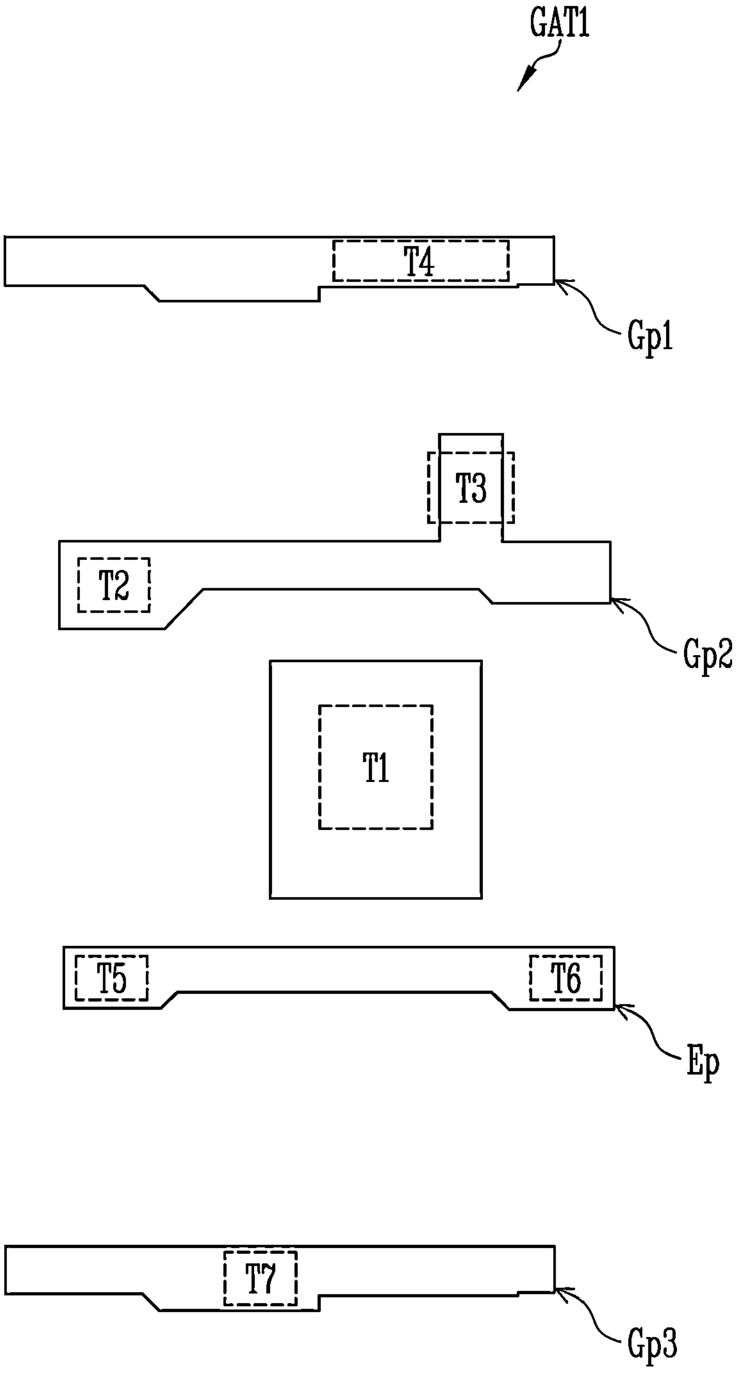
FIG. 18 is a layout diagram of a first gate electrode layer of FIG. 16.
Figure 19:
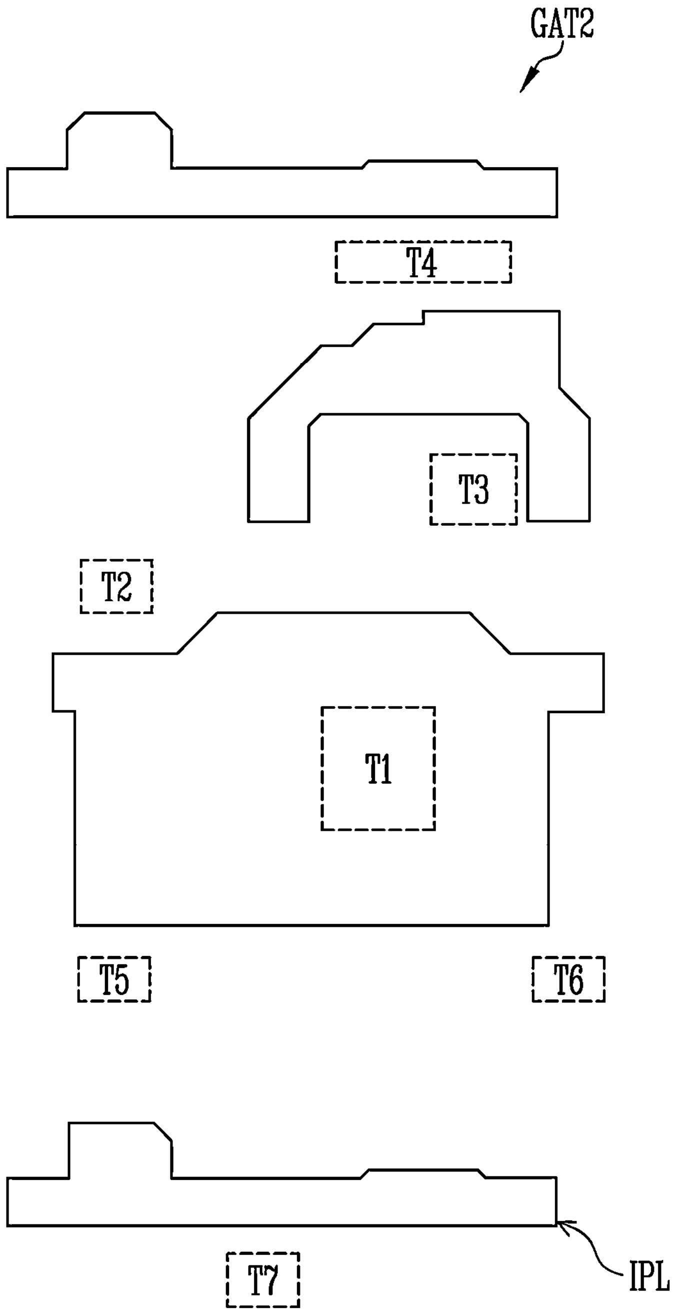
FIG. 19 is a layout diagram of a second gate electrode layer of FIG. 16.
Figure 20:
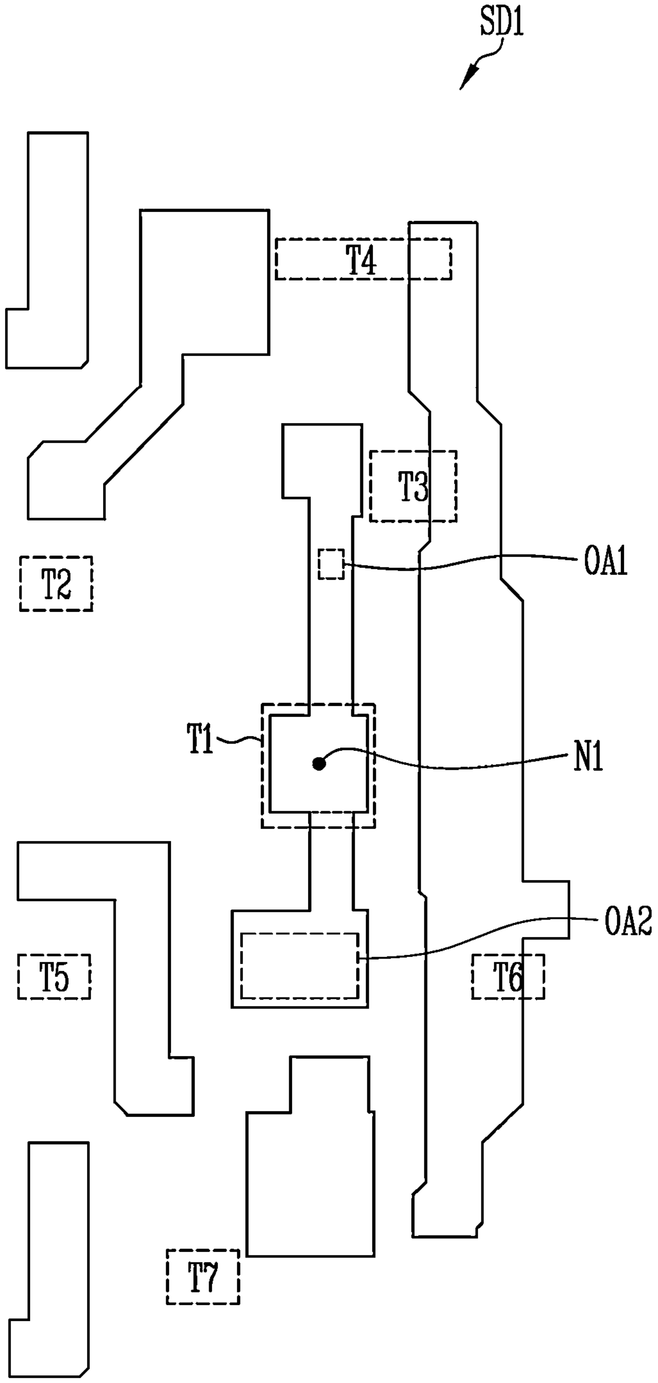
FIG. 20 is a layout diagram of a first source-drain electrode layer of FIG. 16.
Figure 21:
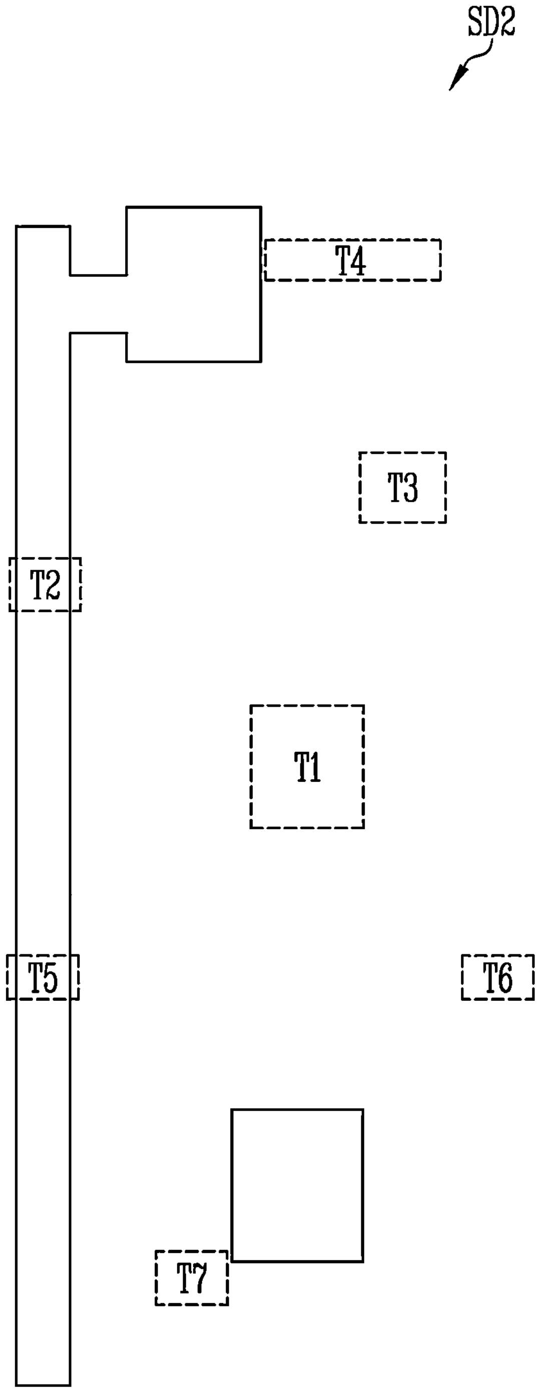
FIG. 21 is a layout diagram of a second source-drain electrode layer of FIG. 16.

FIG. 16 is a layout diagram of one sub pixel in the second pixel according to some example embodiments of the disclosure. FIG. 17 is a layout diagram of a semiconductor layer of FIG. 16. FIG. 18 is a layout diagram of a first gate electrode layer of FIG. 16. FIG. 19 is a layout diagram of a second gate electrode layer of FIG. 16. FIG. 20 is a layout diagram of a first source-drain electrode layer of FIG. 16. FIG. 21 is a layout diagram of a second source-drain electrode layer of FIG. 16.

The shown layout is merely an example, and embodiments are not limited to the shown layout shape. In the present layout diagram, positions of each of the transistor T1 to T7 are indicated.

Referring to FIGS. 16 to 20, the display device 100 includes first and second gate electrode layers GAT1 and GAT2 forming electrodes of the transistors T1 to T7, and first and second source-drain electrode layers SD1 and SD2, a semiconductor layer ACT forming a channel, and an insulating layer. According to some example embodiments, a transistor of a top-gate type in which a gate electrode is arranged above the semiconductor layer ACT may be applied to the transistors T1 to T7, which are P-type transistors.

According to some example embodiments, in order to form each of the transistors T1 to T7, the display device 100 may include the semiconductor layer ACT, the first gate electrode layer GAT1, the second gate electrode layer GAT2, the first source-drain electrode layer SD1, and the second source-drain electrode layer SD2, which are sequentially stacked. Each of an insulating layer may be interposed between the semiconductor layer, the first gate electrode layer GAT1, the second gate electrode layer, the first source-drain electrode layer SD1, and the second source-drain electrode layer. In addition, according to some example embodiments, a passivation layer and the light emitting element OLED may be sequentially arranged on the second source-drain electrode layer SD2.

In order to form each of the transistors T1 to T7, the display device 100 may include contact holes CNT passing through the interposed insulating layer such that the semiconductor layer ACT, the first gate electrode layer GAT1, the second gate electrode layer, the first source-drain electrode layer SD1, and the second source-drain electrode layer are physically connected to each other in some areas where the semiconductor layer ACT, the first gate electrode layer GAT1, the second gate electrode layer, the first source-drain electrode layer SD1, and the second source-drain electrode layer overlap on a plane.

The display device 100 may include via holes VIA passing through the passivation layer to electrically connect some electrodes of the transistors T1 to T7 and the light emitting element OLED.

First, the description will be given based on the first sub pixel SP1 of the second pixel PXL2.

The semiconductor layer ACT may be separated from each other for each of the sub pixels SP1 and SP2. The semiconductor layer ACT may have a specific pattern on a plane.

The semiconductor layer ACT may include poly crystal silicon. The poly crystal silicon may be formed by crystallizing amorphous silicon. An example of the crystallization method may include a rapid thermal annealing (RTA) method, a solid phase crystallization (SPC) method, an excimer laser annealing (ELA) method, a metal induced crystallization (MIC) method, a metal induced lateral crystallization (MILC) method, and a sequential lateral solidification (SLS) method, and the like, but is not limited thereto. As another example, the semiconductor layer ACT may include single crystal silicon, low temperature poly crystal silicon, amorphous silicon, and the like.

The first gate electrode layer GAT1 may be arranged on the semiconductor layer ACT. According to some example embodiments, the insulating layer may be arranged between the semiconductor layer ACT and the first gate electrode layer GAT1. The first gate electrode layer GAT1 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The first gate electrode layer GAT1 may be a single film or a multilayer film.

The second gate electrode layer GAT2 may be arranged on the first gate electrode layer GAT1. According to some example embodiments, the insulating layer may be arranged between the first gate electrode layer GAT1 and the second gate electrode layer GAT2. The second gate electrode layer GAT2 may include at least one metal selected from molybdenum (Mo), aluminum (Al), platinum (Pt), palladium (Pd), silver (Ag), magnesium (Mg), gold (Au), nickel (Ni), and neodymium (Nd), iridium (Ir), chromium (Cr), calcium (Ca), titanium (Ti), tantalum (Ta), tungsten (W), and copper (Cu). The second gate electrode layer GAT2 may be a single film or a multilayer film.

The first gate electrode layer GAT1 and the second gate electrode layer GAT2 may include the first scan line Gp1, the second scan line Gp2, the third scan line Gp3, the gate electrodes of each of the transistors T1 to T7, the emission control line Ep, and the initialization power line IPL. That is, each of first gate electrode layer GAT1 and the second gate electrode layer GAT2 may include the first scan line Gp1, the second scan line Gp2, the third scan line Gp3, the gate electrodes of each of the transistors T1 to T7, the emission control line Ep, and the initialization power line IPL may be arranged in at least one of the first gate electrode layer GAT1 or the second gate electrode layer GAT2.

According to some example embodiments, the first gate electrode layer GAT1 may include the first scan line Gp1, the second scan line Gp2, the third scan line Gp3, the gate electrodes of each of the transistors T1 to T7, the emission control line Ep, and the second gate electrode layer GAT2 may include the initialization power line IPL. At this time, the first scan line Gp1, the second scan line Gp2, the third scan line Gp3, and the emission control line Ep may be formed to be physically separated from each other in the first gate electrode layer GAT1.

The first source-drain electrode layer SD1 may be arranged on the second gate electrode layer GAT2. According to some example embodiments, the insulating layer may be arranged between the second gate electrode layer GAT2 and the first source-drain electrode layer SD1. The first source-drain electrode layer SD1 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The first source-drain electrode layer SD1 may be a single film or a multilayer film.

The second source-drain electrode layer SD2 may be arranged on the first source-drain electrode layer SD1. According to some example embodiments, the insulating layer may be arranged between the first source-drain electrode layer SD1 and the second source-drain electrode layer SD2. The second source-drain electrode layer SD2 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The second source-drain electrode layer SD2 may be a single film or a multilayer film.

The first source-drain electrode layer SD1 and the second source-drain electrode layer SD2 may include the first electrode and the second electrode of each of the transistors T1 to T7, and at least some electrodes of the first boosting capacitor Cb1 and the second boosting capacitor Cb2. That is, the first electrode and the second electrode of each of the transistors T1 to T7, and at least some electrodes of the first boosting capacitor Cb1 and the second boosting capacitor Cb2 may be formed in any one of the first source-drain electrode layer SD1 and the second source-drain electrode layer SD2.

According to some example embodiments, the first source-drain electrode layer SD1 may include the first electrode and the second electrode of each of the transistors T1 to T7, and the data line, and the second source-drain electrode layer SD2 may include the power line PL. However, the layer in which the first electrode and the second electrode of each of the transistors T1 to T7, the power line PL, and the data line are arranged is not limited thereto. That is, each of the first electrode and the second electrode of each of the transistors T1 to T7, the power line PL, and the data line may be arranged in any one of the first source-drain electrode layer SD1 and the second source-drain electrode layer SD2.

For example, according to some example embodiments, the first source-drain electrode layer SD1 may include the first electrode and the second electrode of each of the transistors T1 to T7 and the power line PL, and the second source-drain electrode layer SD2 may include the data line.

According to some example embodiments, the first source-drain electrode layer SD1 may include the first electrode and the second electrode of each of the transistors T1 to T7, and the second source-drain electrode layer SD2 may include the power line PL and the data line.

According to some example embodiments, the first source-drain electrode layer SD1 may include the first electrode and the second electrode of each of the transistors T1 to T7, the power line PL, and the data line.

According to some example embodiments, the second source-drain electrode layer SD2 may include the first electrode and the second electrode of each of the transistors T1 to T7, the power line PL, and the data line.

Meanwhile, according to some example embodiments, the first source-drain electrode layer SD1 may include an electrode pattern electrically connected to the first node N1 and in which a first overlapping area OA1 at least partially overlaps the second scan line Gp2 is defined. In addition, the first source-drain electrode layer SD1 may include an electrode pattern electrically connected to the first node N1 and in which a second overlapping area OA2 at least partially overlaps the emission control line Ep is defined. In the present specification, the expression “overlapping” means that two configurations overlap in a thickness direction of the display device 100 unless otherwise defined.

According to some example embodiments, the first boosting capacitor Cb1 may be formed by the first overlapping area OA1, and the second boosting capacitor Cb2 may be formed by the second overlapping area OA2.

According to some example embodiments, the electrode pattern in which the first overlapping area OA1 and the second overlapping area OA2 are defined is shown as being the same electrode pattern in the first source-drain electrode layer SD1, but is not limited thereto.

According to some example embodiments, the first boosting capacitor Cb1 may include a first electrode (for example, a member electrically connected to the second scan line Gp2 in FIG. 18) included in the first gate electrode layer GAT1 and a second electrode (for example, a member electrically connected to the gate electrode of the first transistor T1 in FIG. 20; a member electrically connected to the first node N1; an electrode including the first overlapping area OA1) included in the first source-drain electrode layer SD1.

According to some example embodiments, the second boosting capacitor Cb2 may includes a first electrode (for example, a member electrically connected to the emission control line Epi in FIG. 18) included in the first gate electrode layer GAT1 and a second electrode (for example, a member electrically connected to the gate electrode of the first transistor T1 in FIG. 20; a member electrically connected to the first node N1; an electrode including the second overlapping area OA2) included in the first source-drain electrode layer SD1.

Next, the first sub pixel SP1 of the first pixel PXL1 is described.

Figure 22:
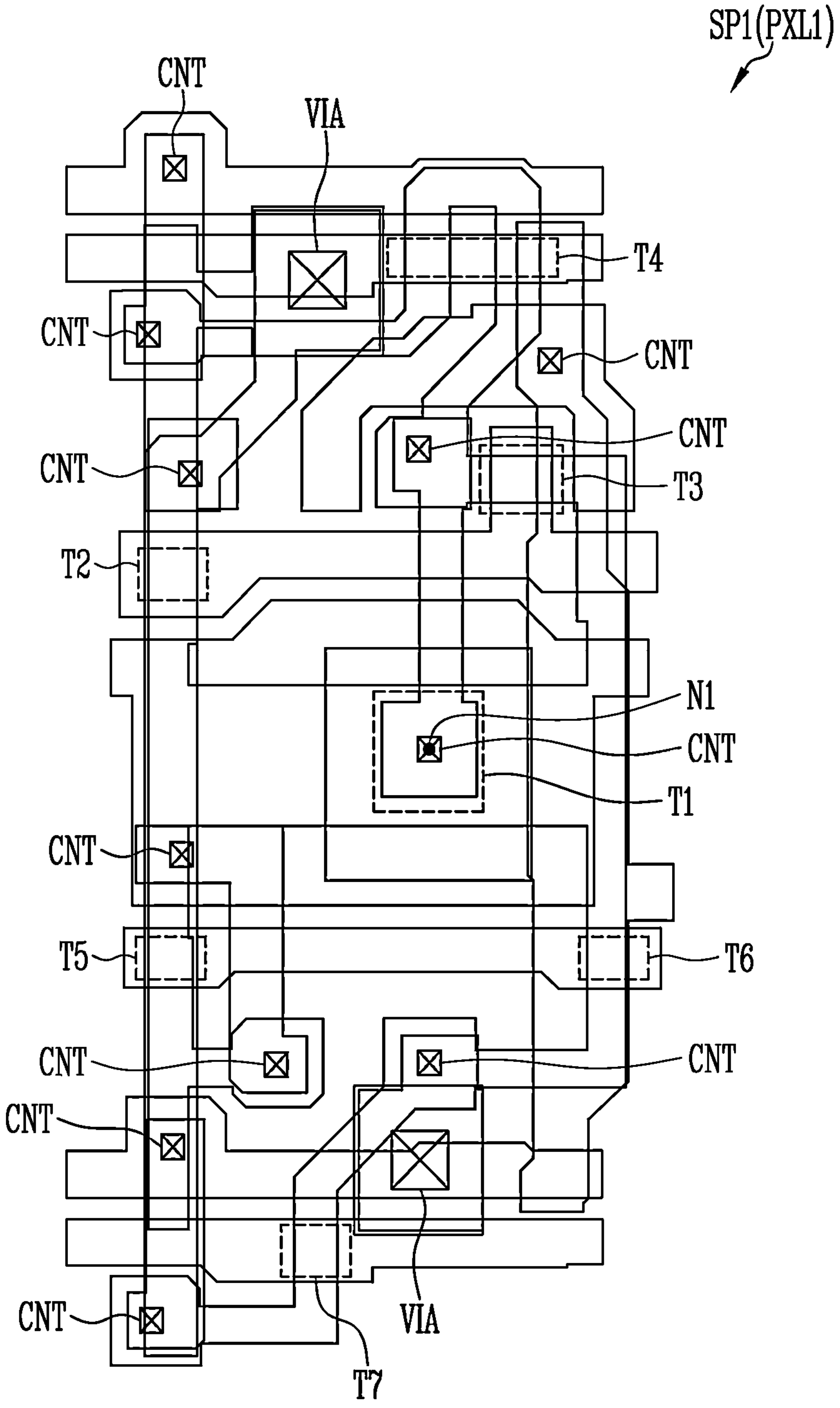
FIG. 22 is a layout diagram of one sub pixel in the second pixel according to some example embodiments of the disclosure.

FIG. 22 is a layout diagram of one sub pixel in the second pixel according to some example embodiments of the present disclosure.

Referring to FIGS. 16 and 22, the first sub pixel SP1 of the first pixel PXL1 may not include the second overlapping area OA2. A shape of the first sub pixel SP1 of the first pixel PXL1 is similar to a shape of the first sub pixel SP1 of the second pixel PXL2, except that the second overlap are OA2 is not included.

Accordingly, each of the sub pixels SP1 and SP2 of the second pixel PXL2 may include the first boosting capacitor Cb1 and the second boosting capacitor Cb2, and each of the sub pixels of the first pixel PXL1 may include the first boosting capacitor Cb1. However, a coupling phenomenon similar to that of the second boosting capacitor Cb2 may occur in each of the sub pixels SP1 and SP2 of the first pixel PXL1 due to a fringe phenomenon.

That is, in each of the sub pixels SP1 and SP2 of the first pixel PXL1, the electrode electrically connected to the first node N1 and the emission control line Ep are formed so as not to overlap on a plane, but a coupling phenomenon due to a fringe phenomenon may occur between the electrode electrically connected to the first node N1 and the emission control line Ep.

At this time, a capacitance of the first boosting capacitor Cb1 may be greater than a capacitance between the electrode electrically connected to the first node N1 and the emission control line Ep in the first pixel PXL1.

According to some example embodiments, the area in which each of the pixels PXL1 and PXL2 is arranged may be different for each of the pixels PXL1 and PXL2. The area of each of the pixels PXL1 and PXL2 may mean the area of an area including the pixel circuit PXC, a plurality of signal lines connected to the pixel circuit PXC, and the light emitting element OLED. According to some example embodiments, the area of each of the pixels PXL1 and PXL2 may mean the area of a light emission surface of the light emitting element OLED, for example, the size of the light emission area in which light is emitted. According to some example embodiments, the area of each of the sub pixels of the second pixel PXL2 may be less than the area of each of the sub pixel of the first pixel PXL1. Accordingly, as compared with the first pixel PXL1, a transmission portion of the second pixel PXL2 for elements arranged under the pixel circuit PXC may be increased.

Figure 23:
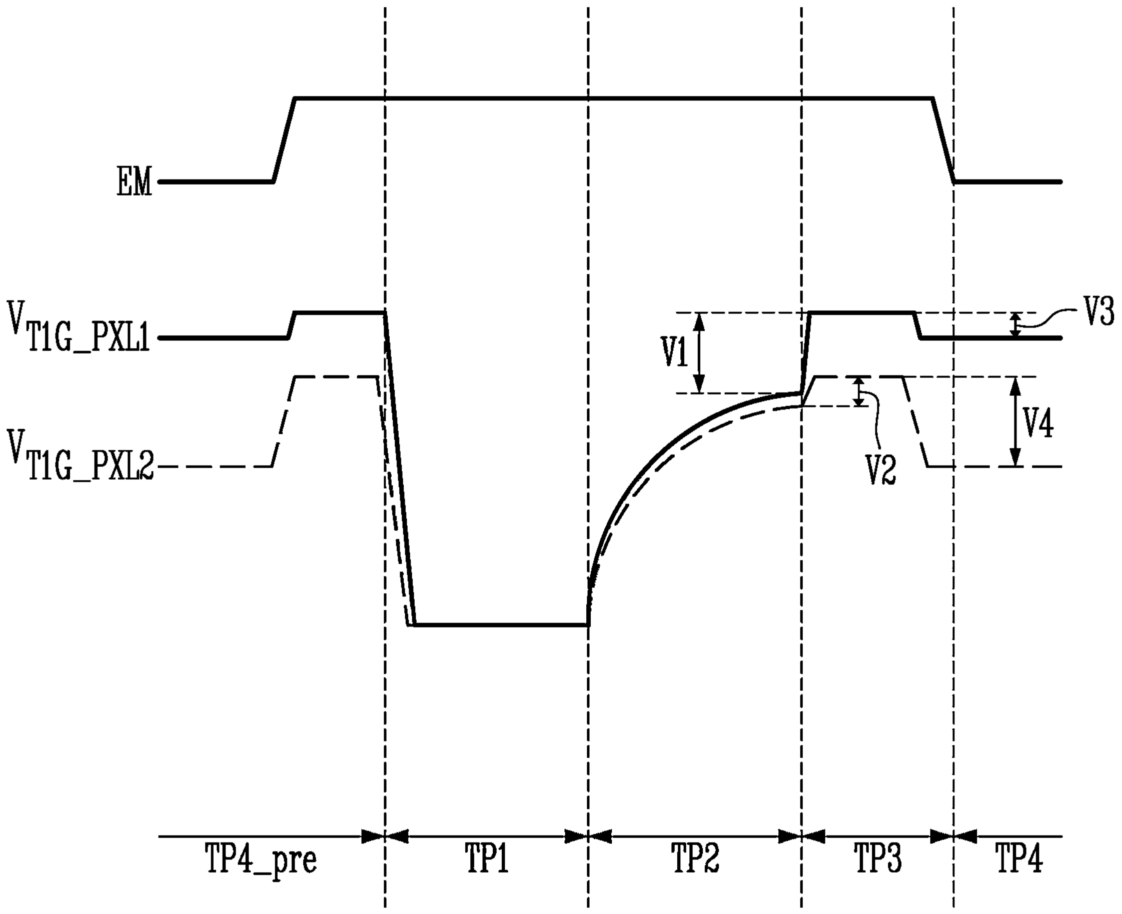
FIG. 23 is a timing diagram illustrating a method of driving the display device according to some example embodiments of the disclosure.

FIG. 23 is a timing diagram illustrating a method of driving the display device according to some example embodiments of the present disclosure.

In FIG. 23, because the fifth transistor T5 and the sixth transistor T6 are P-type transistors, the fifth transistor T5 and the sixth transistor T6 may have a gate-on signal when an emission control signal EM is a first voltage level (low level) and may have a gate-on signal when the emission control signal EM is a second voltage level (high level).

In FIG. 23, for convenience of description, each frame is divided into four periods, but embodiments are not limited thereto.

One frame may include an initialization period TP1, a data writing period TP2, a delay period TP3, and an emission period TP4. Before the initialization period TP1 of one frame corresponds to an emission period TP4_pre of a previous frame.

The initialization period TP1 corresponds to a period in which the fourth transistor and the seventh transistor are turned on and thus the gate electrode of the first transistor T1 and/or the anode of the light emitting element is initialized to the initialization voltage.

In the initialization period TP1, voltage levels $V_{T1G\_PXL1}$ and $V_{T1G\_PXL2}$ of the gate electrode of the first transistor T1 is changed to a voltage level of the initialization voltage, and the voltage level of the initialization voltage may be maintained during the initialization period TP1. According to some example embodiments, both of the voltage levels voltage levels $V_{T1G\_PXL1}$ and $V_{T1G\_PXL2}$ of the gate electrode of each first transistor T1 in each of the sub pixels SP1 and SP2 of the first pixel PXL1 and the second pixel PXL2 may have a voltage level similar to the voltage level of the initialization voltage.

The data writing period TP2 corresponds to a period in which the second transistor T2 is turned on and thus the data signal is written to the first electrode of the first transistor T1.

In the data writing period TP2, the data signal may be gradually charged in the storage capacitor, and thus the voltage levels $V_{T1G\_PXL1}$ and $V_{T1G\_PXL2}$ of the gate electrode of the first transistor T1 may be gradually changed. According to some example embodiments, the data signal may be charged, and thus the voltage levels $V_{T1G\_PXL1}$ and $V_{T1G\_PXL2}$ of the gate electrode of each first transistor T1 in each sub pixel of the first pixel PXL1 and the second pixel PXL2 may be gradually increased.

The delay period TP3 is a period in which the second transistor T2 is turned off and the fifth transistor T5 and the sixth transistor t6 are turned off, and corresponds to a period before light emission of the light emitting element OLED starts after the data signal writing is ended.

In the delay period TP3, when the second transistor T2 is turned off in each of the sub pixels SP1 and SP2 of the first pixel PXL1, the voltage level $V_{T1G\_PXL1}$ of the gate electrode of the first transistor T1 may increase by a first level V1 by an influence of the first boosting capacitor Cb1.

Meanwhile, in the delay period TP3, when the second transistor T2 is turned off in each of the sub pixels SP1 and SP2 of the second pixel PXL2, the voltage level $V_{T1G\_PXL2}$ of the gate electrode of the first transistor T1 may increase by a second level V2 less than the first level V1 by an influence of the second boosting capacitor Cb2.

The emission period TP4 corresponds to a period in which the fifth transistor T5 and the sixth transistor T6 are turned on, and thus the light emitting element OLED emits light.

In the emission period TP4, when the fifth transistor T5 and the sixth transistor T6 are turned on in each of the sub pixels SP1 and SP2 of the first pixel PXL1, the voltage level $V_{T1G\_PXL1}$ of the gate electrode of the first transistor T1 may decrease by a third level V3 by the influence of the first boosting capacitor Cb1.

Meanwhile, in the emission period TP4, when the fifth transistor T5 and the sixth transistor T6 are turned on in each of the sub pixels SP1 and SP2 of the second pixel PXL2, the voltage level $V_{T1G\_PXL2}$ of the gate electrode of the first transistor T1 may decrease by a fourth level V4 greater than the third level V3 by an influence of the first boosting capacitor Cb1 and the second boosting capacitor Cb2.

According to some example embodiments, the first pixel PXL1 may be configured such that the capacitance of the first boosting capacitor Cb1 is relatively great. Accordingly, as shown in the drawing, the voltage level $V_{T1G\_PXL1}$ of the gate electrode of the first transistor T1 may maintain a relatively high voltage.

According to some example embodiments, the second pixel PXL2 may be configured such that the capacitance of the first boosting capacitor Cb1 is decreased and the capacitance of the second boosting capacitor Cb2 is increased. Accordingly, as shown in the drawing, the voltage level $V_{T1G\_PXL2}$ of the gate electrode of the first transistor T1 may maintain a relatively low voltage.

In such a method, the voltage levels $V_{T1G\_PXL1}$ and $V_{T1G\_PXL2}$ of the gate electrode of each first transistor T1 of the first pixel PXL1 and the second pixel PXL2 may be adjusted to be different. Therefore, even though the data signals of the same voltage level are provided to the first pixel PXL1 and the second pixel PXL2, a current difference provided to each light emitting element OLED of the first pixel PXL1 and the second pixel PXL2 is generated, and thus a luminance may be adjusted.

Next, the display device and a method of driving the display device according to some example embodiments will be described in more detail below. Hereinafter, the same or similar reference numerals are used for the same components on the drawings as those of FIGS. 1 to 23, and description thereof is omitted.

Figure 24:
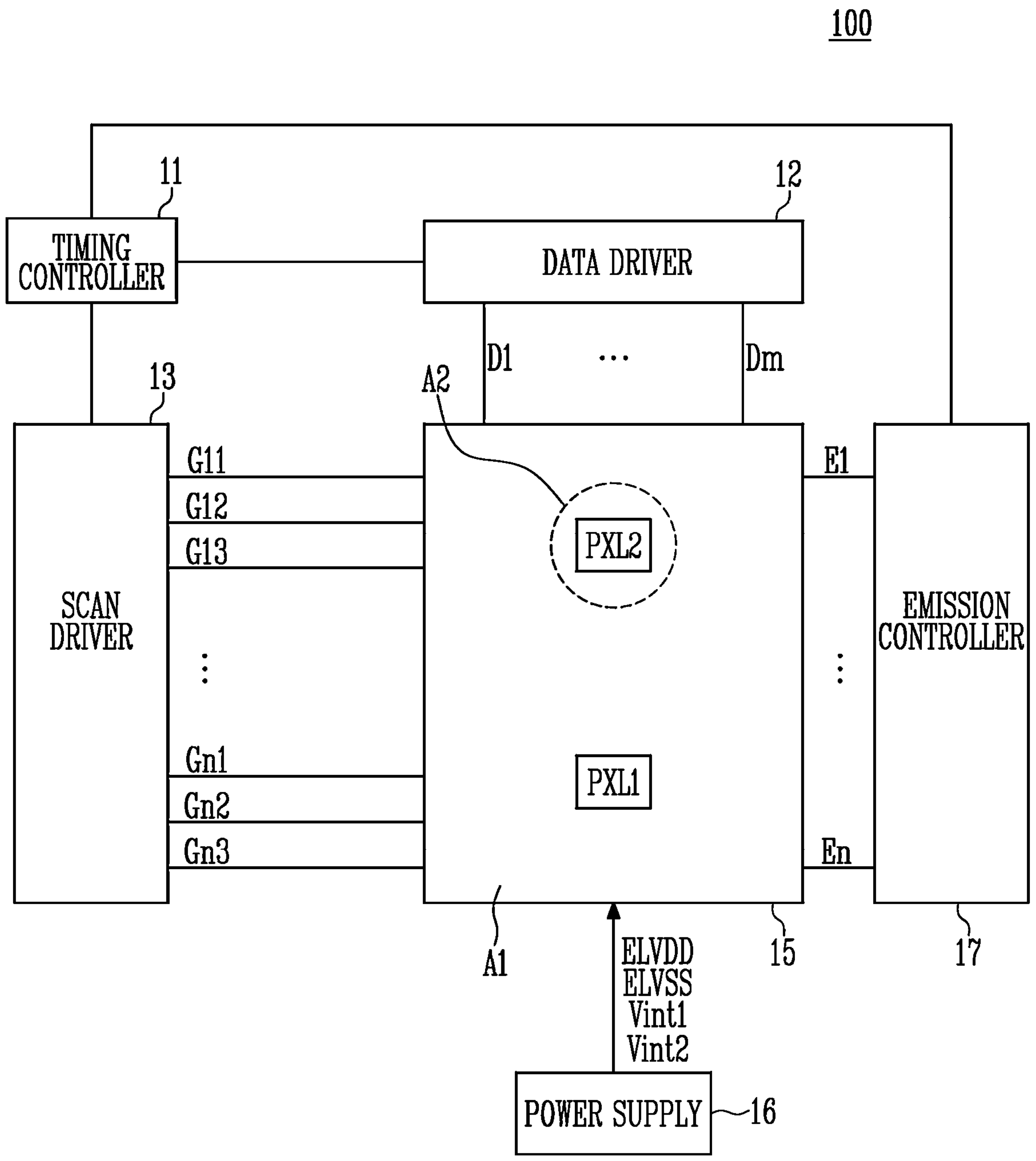
FIG. 24 is a block diagram schematically illustrating the display device according to some example embodiments of the disclosure.
Figure 26:
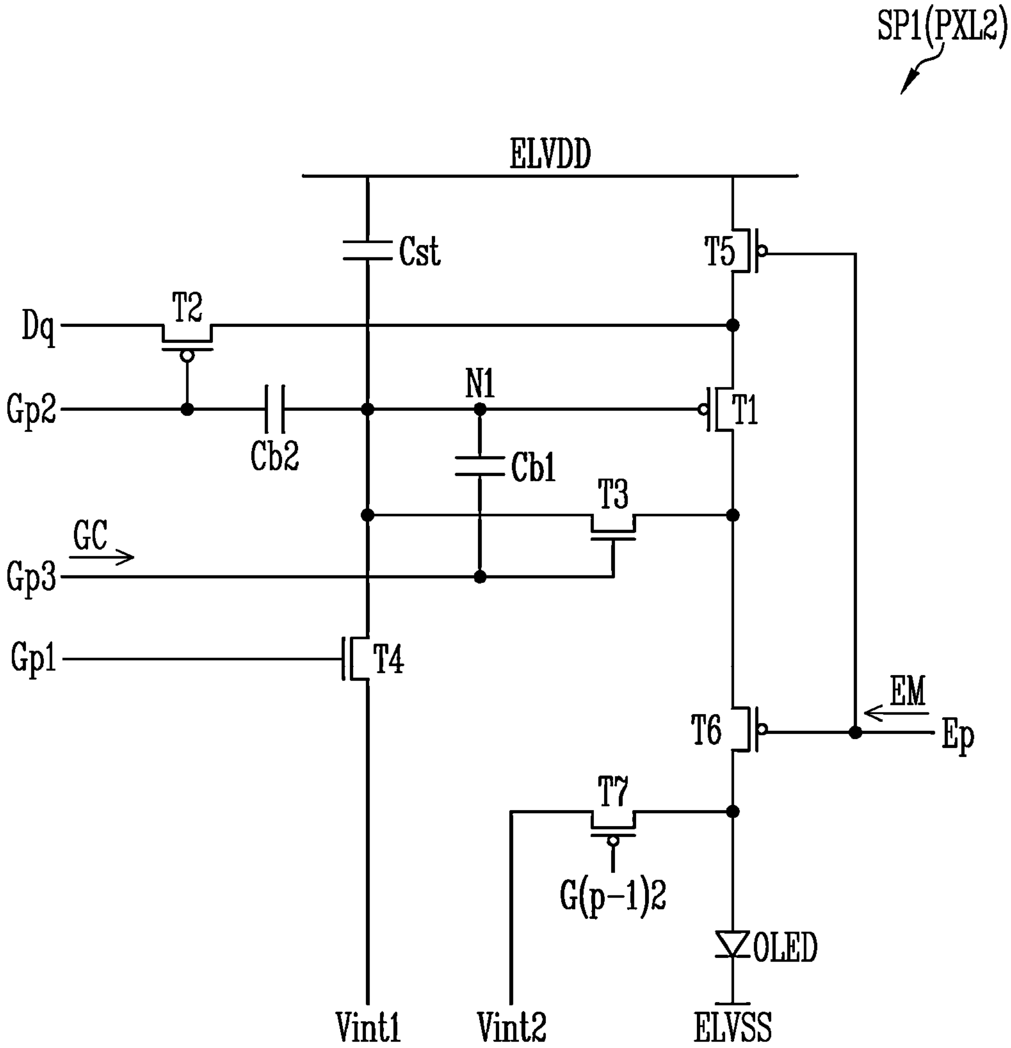
FIG. 26 is a circuit diagram illustrating an electrical connection relationship between components included in a sub pixel of a second pixel shown in FIG. 24 according to some example embodiments.
Figure 27:
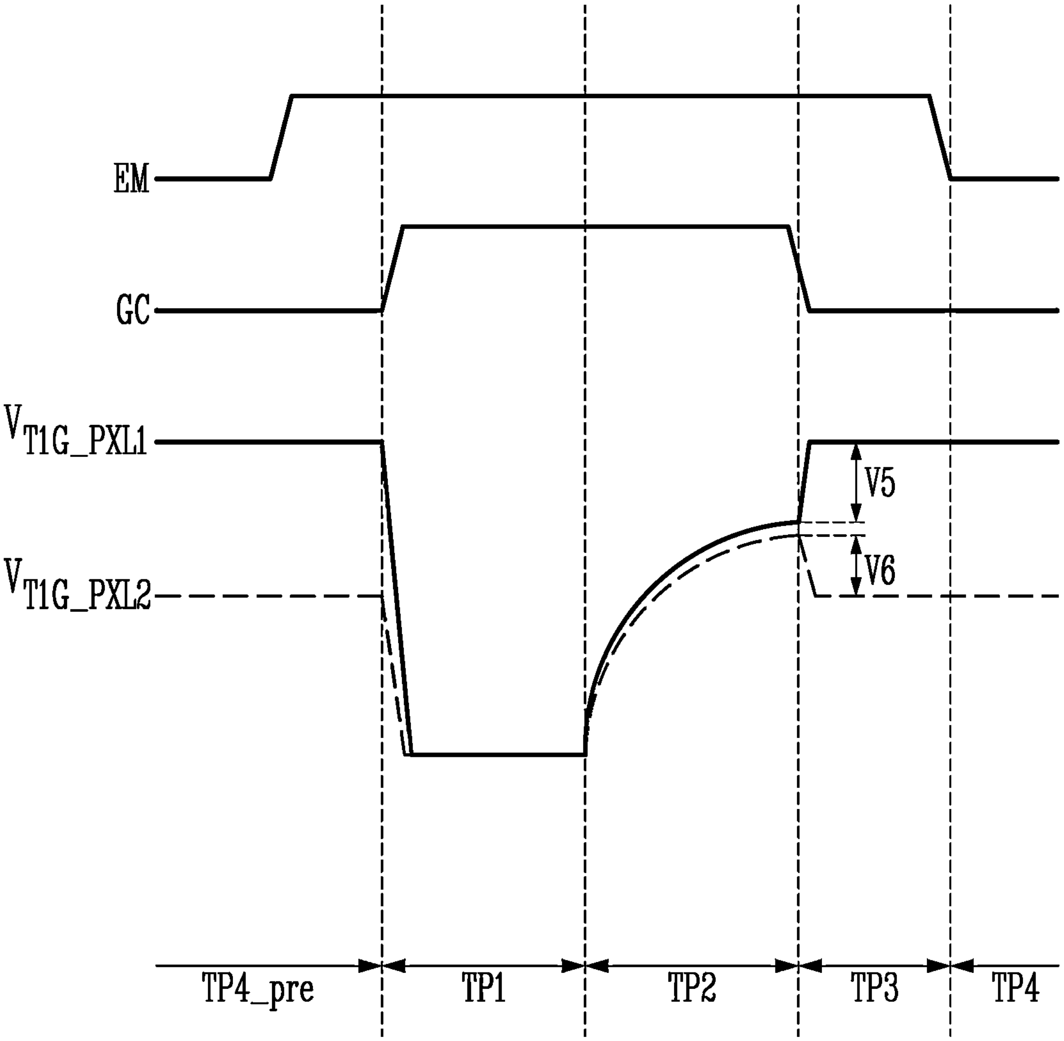
FIG. 27 is a timing diagram illustrating a method of driving the display device shown in FIG. 24.
Figure 28:
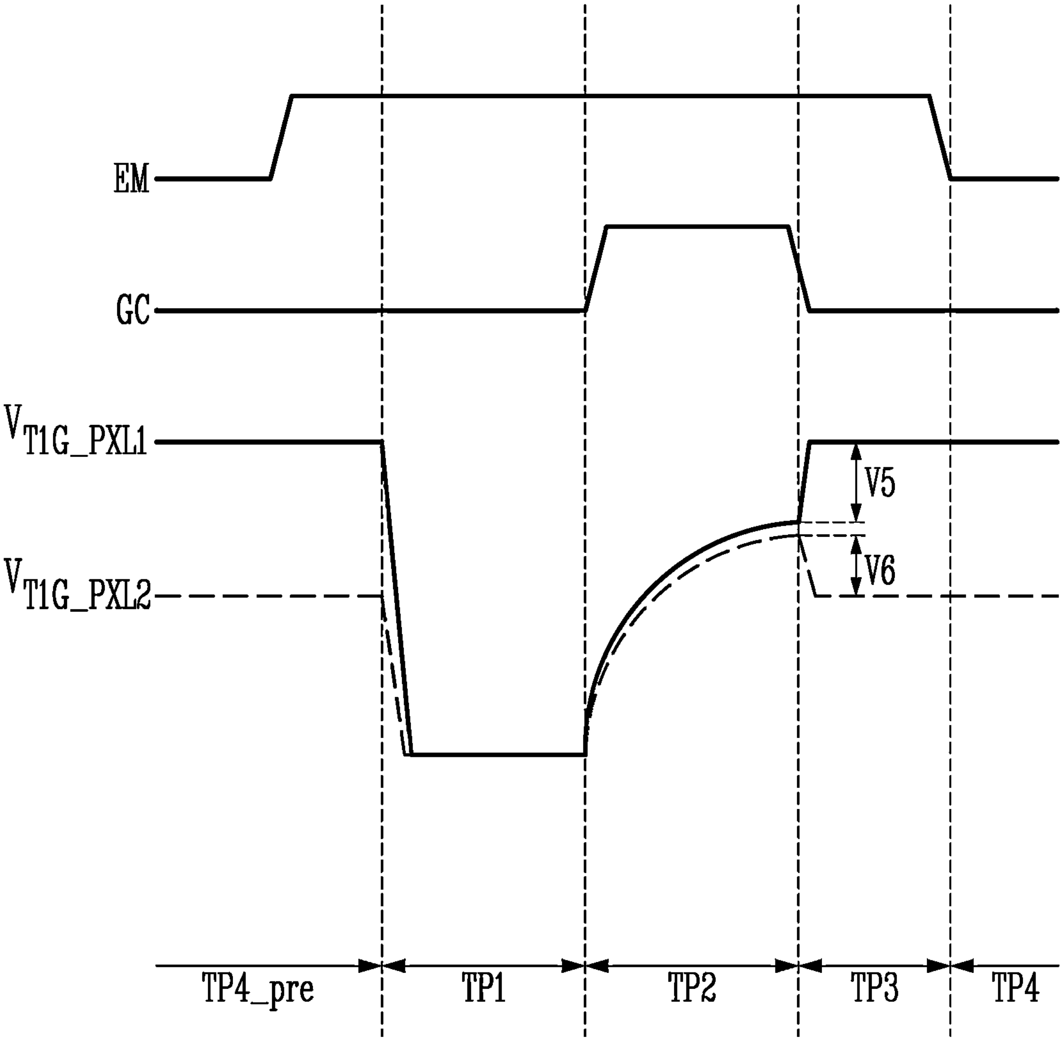
FIG. 28 is a timing diagram according to a modified example of FIG. 27.

FIG. 24 is a block diagram schematically illustrating the display device according to some example embodiments of the disclosure. FIG. 25 is a circuit diagram illustrating an electrical connection relationship between components included in the sub pixel of the first pixel shown in FIG. 24 according to some example embodiments. FIG. 26 is a circuit diagram illustrating an electrical connection relationship between components included in the sub pixel of the second pixel shown in FIG. 24 according to some example embodiments. FIG. 27 is a timing diagram illustrating a method of driving the display device shown in FIG. 24. FIG. 28 is a timing diagram according to a modified example of FIG. 27.

Referring to FIGS. 24 to 27, the display device according to some example embodiments is different from the embodiments described with respect to FIGS. 7, 9, 15, and 23 in that some transistors in each sub pixel SP1 of the first pixel PXL1 and the second pixel PXL2 are N-type transistors.

The power supply 16 may provide a first initialization voltage Vint1 for initializing the gate electrode of the driving transistor for each of the pixels PXL1 and PXL2 and a second initialization voltage Vint2 for initializing the anode of the light emitting element OLED.

First, an electrical connection relationship will be described based on the first sub pixel SP1 of the first pixels PXL1.

The first electrode of the first transistor T1 (the driving transistor) may be connected to the first power ELVDD through the fifth transistor T5, and the second electrode may be connected to the anode of the light emitting element OLED through the sixth transistor T6. The first electrode corresponds to any one of the source electrode and the drain electrode, and the second electrode corresponds to the other one of the source electrode and the drain electrode. The gate electrode of the first transistor T1 may be connected to the first node N1. The first transistor T1 may control the current amount flowing from the first power ELVDD to the second power ELVSS through the light emitting element OLED in correspondence with the voltage of the first node N1.

The second transistor T2 (the switching transistor) may be connected between the j-th data line Dj and the first electrode of the first transistor T1. In addition, the gate electrode of the second transistor T2 may be connected to the second scan line Gi2. The second transistor T2 may be turned on when the scan signal is supplied to the second scan line Gi2 to electrically connect the j-th data line Dj and the first electrode of the first transistor T1 to each other.

The third transistor T3 (the diode connection transistor) may be connected between the second electrode of the first transistor T1 and the first node N1. In addition, the gate electrode of the third transistor T3 may be connected to the third scan line Gi3. The third transistor T3 may be turned on when the scan signal of the gate-on voltage is supplied to the third scan line Gi3 to electrically connect the second electrode of the first transistor T1 and the first node N1 to each other. Therefore, when the third transistor T3 is turned on, the first transistor T1 may be connected in a form of a diode.

The fourth transistor T4 (the gate initialization transistor) may be connected between the first node N1 and the initialization power line IPL to which the first initialization power Vint1 is applied. In addition, the gate electrode of the fourth transistor T4 may be connected to the first scan line Gi1. The fourth transistor T4 may be turned on when the scan signal is supplied to the first scan line Gi1 to supply a voltage of the first initialization power Vint1 to the first node N1.

The fifth transistor T5 (the first emission transistor) may be connected between the first transistor T1 and the power line PL to which the first power ELVDD is applied. In addition, the gate electrode of the fifth transistor T5 may be connected to the i-th emission control line Ei. The fifth transistor T5 may be turned off when the emission control signal of the gate-off voltage is supplied to the i-th emission control line Ei, and may be turned on in other cases.

The sixth transistor T6 (the second emission transistor) may be connected between the first transistor T1 and the light emitting element OLED. In addition, the gate electrode of the sixth transistor T6 may be connected to the i-th emission control line Ei. The sixth transistor T6 may be turned off when the emission control signal of the gate-off voltage (for example, the high level voltage) is supplied to the i-th emission control line Ei, and may be turned on in other cases.

The seventh transistor T7 (the anode initialization transistor) may be connected between the initialization power line IPL to which the second initialization power Vint2 is applied and a first electrode, for example, the anode of the light emitting element OLED. In addition, the gate electrode of the seventh transistor T7 may be connected to a second scan line G(i−1)2. The seventh transistor T7 may be turned on when the scan signal of the gate-on voltage (for example, the low level voltage) is supplied to the second scan line G(i−1)2 to supply a voltage of the second initialization power Vint2 to the anode of the light emitting element OLED. Here, the voltage of the second initialization power Vint2 may be set to a voltage less than the data signal. That is, the voltage of the second initialization power Vint2 may be set to be equal to or less than the minimum voltage of the data signal.

The storage capacitor Cst may be connected between the power line PL to which the first power ELVDD is applied and the first node N1. The storage capacitor Cst may store a voltage corresponding to the data signal and the threshold voltage of the first transistor T1.

The first boosting capacitor Cb1 may be connected between the first node N1 and the third scan line Gi3. The first boosting capacitor Cb1 may mean a capacitor generated by a coupling phenomenon generated in a case where the first node N1 and the third scan line Gi3 overlap on a plane or a coupling phenomenon generated due to a fringe phenomenon even though the first node N1 and the third scan line Gi3 do not overlap on the plane. The first boosting capacitor Cb1 may be formed between the gate electrode of the first transistor T1 electrically connected to the first node N1 and the gate electrode of the second transistor T2 electrically connected to the third scan line Gi3. In addition, the first boosting capacitor Cb1 may be formed between the gate electrode of the first transistor T1 electrically connected to the first node N1 and the gate electrode of the third transistor T3 electrically connected to the third scan line Gi3.

According to some example embodiments, some transistors (for example, T1, T2, T5, T6, and T7) may be P-type transistors, and the remaining transistors (for example, T3 and T4) may be N-type transistors. According to some example embodiments, a bottom gate type transistor in which the gate electrode is arranged under the semiconductor layer may be applied to the third transistor T3 and the fourth transistor T4, which are N-type transistors.

Next, an electrical connection relationship will be described based on the first sub pixel SP1 of the second pixels PXL2. Because the pixel circuit PXC in the second pixel PXL2 has the same or similar connection relationship except that the pixel circuit PXC further includes the second boosting capacitor Cb2 compared to the pixel circuit PXC in the first pixel PXL1, repetitive description thereof will be omitted.

The second boosting capacitor Cb2 may be connected between the first node N1 and the second scan line Gp2. The second boosting capacitor Cb2 may mean a capacitor generated by a coupling phenomenon generated in an area where an electrode electrically connected to the first node N1 and the second scan line Gp2 overlap on a plane and a coupling phenomenon generated due to a fringe phenomenon in an area where the electrode electrically connected to the first node N1 and the second scan line Gp2 do not overlap on the plane.

According to some example embodiments, the capacitance of the first boosting capacitor Cb1 in the first pixel PXL1 may be less than the capacitance between the electrode electrically connected to the first node N1 and the second scan line Gi2. The capacitance of the second boosting capacitor Cb2 in the second pixel PXL2 may be less than the capacitance of the first boosting capacitor Cb1. According to the capacitance of the second boosting capacitor Cb2, a current difference provided to each light emitting element OLED of the first pixel PXL1 and the second pixel PXL2 may be largely generated. Specifically, the smaller the capacitance of the second boosting capacitor Cb2, the more luminance may be emitted, and an effect of reducing the area of the pixel circuit PXC may be obtained. Accordingly, an aperture ratio of the elements arranged under the pixel circuit PXC of the second pixel PXL2 may be increased compared to the first pixel PXL1.

According to some example embodiments, a scan signal GC provided to the third scan lines Gi3 and Gp3 may be maintained as a first voltage level (low level), which is a gate-off signal, in the emission period TP4_pre of a previous frame, may be transited to a second voltage level (high level), which is a gate-on signal, at a time point at which the initialization period TP1 is started, and may be transited to the first voltage level (low level), which is the gate-off signal at a time point at which the delay period TP3 is started (see FIG. 27).

According to some example embodiments, the scan signal GC provided to the third scan lines Gi3 and Gp3 may be maintained as the first voltage level (low level), which is the gate-off signal, in the emission period TP4_pre of the previous frame, may be transited to the second voltage level (high level), which is the gate-on signal, at a time point at which the data writing period TP2 is started, and may be transited to the first voltage level (low level), which is the gate-off signal at the time point at which the delay period TP3 is started (see FIG. 28).

In the delay period TP3, when the second transistor T2 is turned off in each of the sub pixels SP1 and SP2 of the first pixel PXL1, the voltage level $V_{T1G\_PXL1}$ of the gate electrode of the first transistor T1 may increase by a fifth level V5 by the influence of the first boosting capacitor Cb1.

Meanwhile, in the delay period TP3, when the second transistor T2 is turned off in each of the sub pixels SP1 and SP2 of the second pixel PXL2, the voltage level $V_{T1G\_PXL2}$ of the gate electrode of the first transistor T1 may decrease by a sixth level less than the fifth level V5 by the influence of the first boosting capacitor Cb1 and the second boosting capacitor Cb2.

In the emission period TP4, the voltage levels $V_{T1G\_PXL1}$ and $V_{T1G\_PXL2}$ of the gate electrode of each first transistors T1 of the first pixel PXL1 and the second pixel PXL2 may be maintained as a voltage level similar to that in the delay period TP3.

In such a method, the voltage levels $V_{T1G\_PXL1}$ and $V_{T1G\_PXL2}$ of the gate electrode of each first transistor T1 of the first pixel PXL1 and the second pixel PXL2 may be adjusted to be different. Therefore, even though the data signals of the same voltage level are provided to the first pixel PXL1 and the second pixel PXL2, a current difference provided to each light emitting element OLED of the first pixel PXL1 and the second pixel PXL2 is generated, and thus a luminance may be adjusted.

Although aspects of some example embodiments according to the present disclosure have been described with reference to the accompanying drawings, it will be understood by those skilled in the art to which the disclosure pertains that the embodiments may be implemented in other specific forms without changing the technical spirit and essential features of the disclosure. Therefore, it should be understood that the embodiments described above are illustrative and are not restrictive in all aspects.

What is claimed is:

1. A display device comprising a plurality of first pixels, wherein the plurality of first pixels comprises:

a light emitting element;

a first transistor configured to generate a driving current to flow to the light emitting element;

a second transistor connected between a data line and a first electrode of the first transistor;

a third transistor connected between a second electrode of the first transistor and a first node connected to a gate electrode of the first transistor;

a fourth transistor connected between the first node and a first initialization power line configured to provide a first initialization power, wherein the fourth transistor is an N-type transistor;

a fifth transistor connected between a first power line and the first electrode of the first transistor;

a sixth transistor connected between the second electrode of the first transistor and the light emitting element;

a seventh transistor connected between a second initialization power line and the first electrode of the light emitting element, wherein the seventh transistor is a P-type transistor and, wherein the second initialization power line is configured to provide a second initialization power;

a storage capacitor connected between the first power line and the first node; and a first boosting capacitor connected between the first node and a second scan line coupled to a gate electrode of the second transistor, wherein the fourth and seventh transistors are configured to be turned on in response to signals received from different scan lines.

2. The display device according to claim 1, further comprising a plurality of second pixels, wherein a density of a second display unit comprising the plurality of second pixels is lower than a density of a first display unit comprising the plurality of first pixels.

3. The display device according to claim 2, wherein the plurality of second pixels comprises the first to seventh transistors, the storage capacitor, and the first boosting capacitor, and wherein the plurality of second pixels further comprises a second boosting capacitor connected between the first node and a third scan line configured to provide a third scan signal.

4. The display device according to claim 3, wherein a capacitance of the first boosting capacitor of the plurality of second pixels is smaller than a capacitance of the second boosting capacitor of the plurality of second pixels.

5. The display device according to claim 3, wherein the plurality of first pixels does not include the second boosting capacitor connected between the first node and the third scan line configured to provide the third scan signal.

6. The display device according to claim 3, wherein the first transistor, the second transistor, the fifth transistor, and the sixth transistor in the plurality of second pixels are P-type transistors, and wherein the third transistor in the plurality of second pixels is the N-type transistor.

7. The display device according to claim 2, wherein the plurality of first pixels surrounds the plurality of second pixels.

8. The display device according to claim 7, wherein the plurality of first pixels is configured to emit light with a first luminance, and the plurality of second pixels is configured to emit light with a second luminance, and wherein the second luminance is higher than the first luminance.

9. The display device according to claim 1, wherein a capacitance of the first boosting capacitor of the plurality of first pixels is smaller than a capacitance between an electrode of the first node and the second scan line.

10. The display device according to claim 1, wherein a capacitance of the first boosting capacitor of the plurality of first pixels is greater than a capacitance between an electrode of the first node and a light emission control line.

* * * * *